United States Patent
Yu et al.

(10) Patent No.: US 11,723,072 B2
(45) Date of Patent: Aug. 8, 2023

(54) METHOD FOR TRANSMITTING RANDOM ACCESS RESPONSE, ACCESS NETWORK DEVICE, AND TERMINAL DEVICE

(71) Applicant: Huawei Technologies Co., Ltd., Shenzhen (CN)

(72) Inventors: Haifeng Yu, Beijing (CN); Xin Xiong, Beijing (CN); Zhenzhen Cao, Beijing (CN); Xiao Xiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 16/787,889

(22) Filed: Feb. 11, 2020

(65) Prior Publication Data

US 2020/0178318 A1    Jun. 4, 2020

Related U.S. Application Data

(63) Continuation of application No. PCT/CN2018/094638, filed on Jul. 5, 2018.

(30) Foreign Application Priority Data

Aug. 11, 2017 (CN) .......................... 201710687652.0

(51) Int. Cl.
*H04W 74/08* (2009.01)
*H04W 76/11* (2018.01)
(Continued)

(52) U.S. Cl.
CPC ... *H04W 74/0833* (2013.01); *H04W 72/0446* (2013.01); *H04W 72/23* (2023.01); *H04W 76/11* (2018.02); *H04W 80/02* (2013.01)

(58) Field of Classification Search
CPC ........... H04W 74/0833; H04W 72/042; H04W 72/0446; H04W 76/11; H04W 80/02;
(Continued)

(56) References Cited

U.S. PATENT DOCUMENTS

2012/0082088 A1*  4/2012  Dalsgaard ........... H04L 12/4625
                                                                                        370/315
2013/0046968 A1    2/2013  Dinan
(Continued)

FOREIGN PATENT DOCUMENTS

CN    101873713 A    10/2010
CN    102291836 A    12/2011
(Continued)

OTHER PUBLICATIONS

"MAC PDU Design," 3GPP TSG-RAN WG2 #97bis, Tdoc R2-1702738, Spokane, USA, pp. 1-3, 3rd Generation Partnership Project, Valbonne, France (Apr. 3-7, 2017).
(Continued)

*Primary Examiner* — Michael K Phillips
(74) *Attorney, Agent, or Firm* — Leydig, Voit & Mayer, Ltd.

(57) ABSTRACT

Embodiments of this application provide a method for transmitting a random access response, a network device, and a terminal device. The method includes: determining, by an access network device, a Medium Access Control (MAC) protocol data unit (PDU), where the MAC PDU includes at least two MAC subPDUs, the at least two MAC subPDUs include at least a first MAC subPDU, the first MAC subPDU includes a first MAC subheader and a random access response (RAR) corresponding to the first MAC subheader, and the first MAC subheader is located before the RAR corresponding to the first MAC subheader; and sending, by the access network device, the MAC PDU.

17 Claims, 15 Drawing Sheets

| T | E | RAPID 1 | | | | | | Oct 1 |
|---|---|---|---|---|---|---|---|---|
|   | R | R | R | R | R | R | R | Oct 2 |
| T | E | RAPID 2 | | | | | | Oct 3 |
|   | R | R | R | R | R | R | R | Oct 4 |
| T | E | RAPID 3 | | | | | | Oct 5 |
|   | R | R | R | R | R | R | R | Oct 6 |

(51) Int. Cl.
  *H04W 72/0446* (2023.01)
  *H04W 80/02* (2009.01)
  *H04W 72/23* (2023.01)
(58) Field of Classification Search
  CPC ............ H04W 28/065; H04W 74/006; H04W 74/08; H04W 74/0866; H04W 72/23
  See application file for complete search history.

(56) References Cited

U.S. PATENT DOCUMENTS

| | | | |
|---|---|---|---|
| 2014/0126520 A1 | 5/2014 | Quan et al. | |
| 2014/0226621 A1* | 8/2014 | Choi | H04W 36/0061 370/331 |
| 2018/0359784 A1* | 12/2018 | Agiwal | H04W 74/0833 |
| 2020/0128582 A1* | 4/2020 | Chen | H04W 72/51 |
| 2020/0137776 A1* | 4/2020 | Lee | H04L 5/0044 |
| 2020/0205193 A1* | 6/2020 | Amuru | H04W 72/046 |

FOREIGN PATENT DOCUMENTS

| | | |
|---|---|---|
| CN | 102333521 A | 1/2012 |
| CN | 102595624 A | 7/2012 |
| CN | 102595636 A | 7/2012 |
| CN | 103081379 A | 5/2013 |
| CN | 103987106 A | 8/2014 |
| CN | 104579541 A | 4/2015 |
| CN | 106941730 A | 7/2017 |
| EP | 2136586 A1 | 12/2009 |
| EP | 2205037 A1 | 7/2010 |
| EP | 3621399 A1 | 3/2020 |
| WO | 2012154955 A1 | 11/2012 |

OTHER PUBLICATIONS

"Remaining issues in MAC control element," 3GPP TSG RAN2#97bis Meeting, R2-1702759, Spokane, USA, pp. 1-2, 3rd Generation Partnership Project, Valbonne, France (Apr. 3-7, 2017).
New Postcom, "Discussion on Msg2 for SCell RA," 3GPP TSG RAN WG2 Meeting #76, San Francisco, USA, R2-115973, total 5 pages, 3rd Generation Partnership POroject, Valbonne, France (Nov. 14-18, 2011).
"RA Procedure in NR," 3GPP TSG-RAN WG2 Meeting #98, Hangzhou, China, R2-1704499, pp. 1-3, 3rd Generation Partnership Project, Valbonne, France (May 15-19, 2017).
"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.3.0, pp. 1-107, 3rd Generation Partnership Project, Valbonne, France (Jun. 2017).
"3rd Generation Partnership Project; Technical Specification Group Radio Access Network; Study on Scenarios and Requirements for Next Generation Access Technologies; (Release 14)," 3GPP TR 38.913 V14.3.0, pp. 1-39, 3rd Generation Partnership Project, Valbonne, France (Jun. 2017).
"Proposed Agenda," 3GPP TSG-RAN WG2 Meeting #99, Berlin, Germany, R2-17xxxxx, pp. 1-19, 3rd Generation Partnership Project, Valbonne, France (Aug. 21-25, 2017).
"MAC PDU Design," 3GPP TSG-RAN WG2 #98, Hangzhou, P.R. of China, Tdoc R2-1704363, pp. 1-5, 3rd Generation Partnership Project, Valbonne, France (May 15-19, 2017).
"3rd Generation Partnership Project; Technical Specification Group Radio Access Network; NR; Medium Access Control (MAC) protocol specification (Release 15)," 3GPP TS 38.321 V0.2.0, pp. 1-36, 3rd Generation Partnership Project, Valbonne, France (Aug. 2017).
"Random Access in NR: RAR Contents," 3GPP TSG-RAN WG2 NR#2, Qingdao, China, R2-1706533, pp. 1-3, 3rd Generation Partnership Project, Valbonne, France (Jun. 27-29, 2017).
"Summary of [98#34][NR] On demand SI (Lenovo)," 3GPP TSG-RAN WG2 Nr AdHoc, Qingdao, China, R2-1707090, pp. 1-35, 3rd Generation Partnership Project, Valbonne, France (Jun. 27-29, 2017).
"3rd Generation Partnership Project;Technical Specification Group Radio Access Network; NR; NR and NG-RAN Overall Description; Stage 2 (Release 15)," 3GPP TS 38.300 V0.6.0, pp. 1-58, 3rd Generation Partnership Project, Valbonne, France (Aug. 2017).
"Random Access in NR," 3GPP TSG-RAN WG2 Meeting #98, Hangzhou, China, R2-1704579, pp. 1-4, 3rd Generation Partnership Project, Valbonne, France (May 15-19, 2017).
"Text proposal for MAC sub-header format," 3GPP TSG-RAN WG2 #98-AH, Qingdao, P.R. of China, Tdoc R2-1707115, pp. 1-4, 3rd Generation Partnership Project, Valbonne, France (Jun. 27-29, 2017).
"Random Access in NR: RAR MAC PDU Design," 3GPP TSG-RAN WG2 #99, Berlin, Germany, R2-1707683, pp. 1-4, 3rd Generation Partnership Project, Valbonne, France (Aug. 21-25, 2017).

* cited by examiner

METHOD FOR TRANSMITTING RANDOM ACCESS RESPONSE, ACCESS NETWORK DEVICE, AND TERMINAL DEVICE

CROSS-REFERENCE TO RELATED DISCLOSURES

This disclosure is a continuation of International Disclosure No. PCT/CN2018/094638, filed on Jul. 5, 2018, which claims priority to Chinese Patent Application No. 201710687652.0, filed on Aug. 11, 2017. The disclosures of the aforementioned disclosures are hereby incorporated by reference in their entireties.

TECHNICAL FIELD

Embodiments of this application relate to the communications field, and more specifically, to a method for transmitting a random access response, an access network device, and a terminal device in the communications field.

BACKGROUND

In a wireless communications system, a terminal device needs to establish a connection to a network. This process is generally referred to as a random access (RA) procedure. Through random access, the terminal device can establish uplink synchronization with the network, and obtain a unique cell radio network temporary identifier (C-RNTI). An ultimate objective of the random access is to establish synchronization. The terminal device can perform uplink transmission only after achieving the uplink synchronization. In addition, the random access is further used for a special purpose: If no dedicated scheduling request (SR) resource is configured on a physical uplink control channel (PUCCH), the random access may be used to request a scheduling resource.

In a Long Term Evolution (LTE) system, a random access procedure includes a contention-based manner and a non-contention-based manner. A contention-based random access procedure usually includes the following steps: A terminal device randomly selects a random access preamble (RAP) from a random access preamble sequence set, and sends the selected RAP on a random access resource (for example, a physical random access channel (PRACH)) pre-specified by an access network device; the terminal device receives, on a physical downlink shared channel (PDSCH), a random access response (RAR) message delivered by the access network device; the terminal device transmits, based on a C-RNTI included in the RAR message, a random access process message including an identifier of the terminal device in a current cell to an eNB on a physical uplink shared channel (PUSCH) specified in the RAR message, for use in contention resolution; and the terminal device needs to receive a contention resolution message sent by the eNB, thereby completing the random access procedure.

If a plurality of terminal devices send RAPs on a same PRACH resource (which has a same time-frequency location and uses a same RA-RNTI), a plurality of corresponding RARs are multiplexed in a same Medium Access Control (MAC) protocol data unit (PDU). With the large-scale commercial use of 4G; future fifth generation mobile communication (5G) toward 2020 has become a focus of worldwide research and development. However, an existing MAC PDU in the LTE system is not applicable to a future 5G New Radio (NR) system in terms of RAR format uniformity and random access requirements.

SUMMARY

Embodiments of this application provide a method for transmitting a random access response, a network device, and a terminal device, so that a MAC PDU in the embodiments of this application can satisfy requirements of a 5G NR system.

According to a first aspect, a method for sending a random access response is provided, including:

determining, by an access network device, a Medium Access Control (MAC) protocol data unit (PDU), where the MAC PDU includes at least two MAC subPDUs, the at least two MAC subPDUs include at least a first MAC subPDU, the first MAC subPDU includes a first MAC subheader and a random access response (RAR) corresponding to the first MAC subheader, and the first MAC subheader is located before the RAR corresponding to the first MAC subheader; and sending, by the access network device, the MAC PDU.

When the MAC PDU includes at least two first MAC subPDUs, a first MAC subheader and a RAR are placed in an interleaved manner. To be specific, each first MAC subPDU includes a first MAC subheader and a RAR corresponding to the first MAC subheader, and the first MAC subheader is located before and adjacent to the RAR corresponding to the first MAC subheader. In this way, the MAC subheader and the RAR are placed in the interleaved manner, so that the MAC subheader can be immediately placed before the corresponding RAR, thereby changing a conventional MAC PDU format in random access in LTE.

In addition, an existing 5G standard has specified that an interleaved manner in which a MAC subheader and a payload are placed exists in a MAC PDU that is based on data and a MAC CE. Therefore, according to this embodiment of this application, a format of a MAC PDU in random access in a 5G NR system can be uniform with a format of the MAC PDU that is based on data and a MAC CE in the existing 5G standard.

According to a second aspect, an embodiment of the present invention provides an access network device, configured to perform the method according to the first aspect or any possible implementation of the first aspect. Specifically, the access network device includes a module configured to perform the method according to the first aspect or any possible implementation of the first aspect.

According to a third aspect, an embodiment of the present invention provides an access network device, and the access network device includes a memory, a processor, and a transceiver. The memory is configured to store an instruction, and the processor is configured to execute the instruction stored in the memory. In addition, when the processor executes the instruction stored in the memory, the execution enables the processor to perform the method according to the first aspect or any possible implementation of the first aspect.

According to a fourth aspect, an embodiment of the present invention provides a computer readable medium, configured to store a computer program, where the computer program includes an instruction used to perform the method according to the first aspect or any possible implementation of the first aspect.

According to a fifth aspect, a method for receiving a random access response is provided, including:

receiving, by a terminal device, a Medium Access Control (MAC) protocol data unit (PDU) sent by an access network device, where the MAC PDU includes at least two MAC subPDUs, the at least two MAC subPDUs include at least a first MAC subPDU, the first MAC subPDU includes a first MAC subheader and a random access response (RAR) corresponding to the first MAC subheader, and the first MAC subheader is located before the RAR corresponding to the first MAC subheader;

parsing, by the terminal device, a MAC subheader included in each MAC subPDU; and determining, by the terminal device according to a result of parsing the MAC subheader, a MAC subPDU corresponding to the terminal device.

Specifically, when the MAC PDU includes the first MAC subPDU, if the terminal device detects, in the MAC PDU, a RAPID that is the same as a RAPID of the terminal device, the terminal device may immediately obtain a MAC subPDU of the terminal device after the first MAC subheader. Therefore, this embodiment of this application helps the terminal device rapidly obtain a random access response for the terminal device.

According to a sixth aspect, an embodiment of the present invention provides a terminal device, configured to perform the method according to the fifth aspect or any possible implementation of the fifth aspect. Specifically, the terminal device includes a module configured to perform the method according to the fifth aspect or any possible implementation of the fifth aspect.

According to a seventh aspect, an embodiment of the present invention provides a terminal device, and the terminal device includes a memory, a processor, and a transceiver. The memory is configured to store an instruction, and the processor is configured to execute the instruction stored in the memory. In addition, when the processor executes the instruction stored in the memory, the execution enables the processor to perform the method according to the fifth aspect or any possible implementation of the fifth aspect.

According to an eighth aspect, an embodiment of the present invention provides a computer readable medium, configured to store a computer program, where the computer program includes an instruction used to perform the method according to the fifth aspect or any possible implementation of the fifth aspect.

Optionally, the first MAC subheader further includes first indication information, the first indication information is used to indicate a format type of the RAR corresponding to the first MAC subheader, and the format type of the RAR corresponds to a random access event.

With discussion of 5G NR, a new random access event may be introduced into random access. For example, a terminal is in a non-synchronized state in an uplink when downlink data (DL data) arrives in an inactive state; or a terminal is in a non-synchronized state in an uplink when uplink data (UL data) arrives in an inactive state; or a terminal requests on-demand (On-demand) system information (SI); or a terminal sends a beam failure recovery request.

In this embodiment of this application, different random access events may correspond to different types of RARs. For example, a format type of a RAR corresponding to an existing random access event in LTE may be the same as an existing format of a RAR in LTE. In 5G NR, in a scenario in which a terminal is in a non-synchronized state in an uplink when downlink data (DL data) arrives in an inactive state, or a terminal is in a non-synchronized state in an uplink when uplink data (UL data) arrives in an inactive state, a RAR corresponding to a random access event may continue to use the existing format of the RAR in LTE. In 5G NR, a format type of a RAR corresponding to an event that a terminal device requests on-demand SI may be null. In 5G NR, a format type of a RAR corresponding to an event that a terminal device sends a beam failure recovery request may be a format type shown in FIG. 7, that is, includes more UL grants than the RAR format in LTE.

In addition, the format type of the RAR in this embodiment of this application may be another RAR format type different from the existing format of the RAR in LTE. This is not limited in this embodiment of this application. For example, in a handover scenario, because a handover command carries a C-RNTI, a RAR may not carry information such as a temporary C-RNTI.

Specifically, the access network device and the terminal device each may preconfigure a correspondence between a RAPID and a format type of a RAR. In this way, when determining a RAP that needs to be sent to the access network device, the terminal device may determine, based on the preconfigured correspondence between a RAPID and a RAR, a format type of a RAR corresponding to the terminal device. Further, the terminal device may parse at least one MAC subheader in a MAC PDU based on a RAPID, to obtain a random access response for the terminal device.

Optionally, the first indication information has a bit for indicating the format type of the RAR explicitly; or the first MAC subheader further includes a first RAPID, and the first indication information is used to implicitly indicate that there is a correspondence between the first RAPID and the format type of the RAR.

Optionally, the at least two MAC subPDUs further include a second MAC subPDU, the second MAC subPDU includes only a second MAC subheader, the second MAC subheader includes a second RAPID, and there is a correspondence between the second RAPID and one or more on-demand system information requests.

In other words, the second RAPID may be used to indicate success in sending, by using the second RAPID, the one or more on-demand system information requests corresponding to the second RAPID; or the second RAPID is used to indicate that the one or more on-demand system information SI requests corresponding to the second RAPID are successfully received; or the second RAPID may be used to indicate that the second MAC subPDU is an acknowledgement for the on-demand system information SI request.

It should be noted that, in this embodiment of this application, the at least two MAC subPDUs included in the MAC PDU include at least the first MAC subPDU. In other words, at least one of the at least two MAC subPDUs is the first MAC subPDU including the first MAC subheader and the RAR. Moreover, in addition to the first MAC subPDU, the at least two MAC subPDUs may further include the second MAC subPDU including only the second MAC subheader. In addition, the at least two MAC subPDUs may further include a third MAC subPDU including a BI.

If the terminal device detects, in the MAC PDU, the RAPID that is the same as the RAPID of the terminal device, the terminal device can obtain the acknowledgement for the on-demand system information SI request. Therefore, in this embodiment of this application, a new RAR format (to be specific, the RAR format may be null) can be added to the MAC PDU in response to the on-demand system information request of the terminal device, to be applicable to a scenario in which random access is used to request on-demand system information in a 5G system.

Optionally, the at least two MAC subPDUs further include a third MAC subPDU, the third MAC subPDU includes only a third MAC subheader, the third MAC subheader includes backoff indicator information for instructing the terminal device to determine a time interval to initiate a next random access request, when no random access response is detected or no RAPID that is the same as a RAPID sent by the terminal device in a detected MAC PDU.

In this embodiment of this application, different random access priorities may correspond to different backoff indicators BIs. In this case, there may be one or more MAC subPDUs including a BI. For example, a relatively small BI may be set for random access of a relatively high priority, to reduce a waiting time required for re-initiating random access. In this case, a reserved bit R in an E/R/R/R/BI MAC subheader may be used to indicate a random access priority.

Optionally, one or more bits may be selected from reserved bits R to indicate a random access priority.

In this embodiment of this application, the second MAC subPDU may be located before the first MAC subPDU. The third MAC subPDU may be located before the MAC sub-PDUs (namely, the first MAC subPDU and the second MAC subPDU) including the RAPIDs. Optionally, in this embodiment of this application, the second MAC subPDU may be located before or after the first MAC subPDU. This is not limited in this embodiment of this application.

According to a ninth aspect, a method for transmitting a random access response is provided, including:

determining, by an access network device, a Medium Access Control (MAC) protocol data unit PDU, where the MAC PDU includes at least two MAC subPDUs, the at least two MAC subPDUs include at least a fourth MAC subPDU, the fourth MAC subPDU includes a first group MAC subheader and a group random access response RAR corresponding to the first group MAC subheader, the first group MAC subheader includes at least two first random access preamble identifiers RAPIDs, and the group RAR includes at least two RARs in a one-to-one correspondence with the at least two first RAPIDs; and sending, by the access network device, the MAC PDU.

According to a tenth aspect, an embodiment of the present invention provides an access network device, configured to perform the method according to the ninth aspect or any possible implementation of the ninth aspect. Specifically, the access network device includes a module configured to perform the method according to the ninth aspect or any possible implementation of the ninth aspect.

According to an eleventh aspect, an embodiment of the present invention provides an access network device, and the access network device includes a memory, a processor, and a transceiver. The memory is configured to store an instruction, and the processor is configured to execute the instruction stored in the memory. In addition, when the processor executes the instruction stored in the memory, the execution enables the processor to perform the method according to the ninth aspect or any possible implementation of the ninth aspect.

According to a twelfth aspect, an embodiment of the present invention provides a computer readable medium, configured to store a computer program, where the computer program includes an instruction used to perform the method according to the ninth aspect or any possible implementation of the ninth aspect.

According to a thirteenth aspect, a method for transmitting a random access response is provided, including:

receiving, by a terminal device, a Medium Access Control (MAC) protocol data unit (PDU) sent by an access network device, where the MAC PDU includes at least two MAC subPDUs, the at least two MAC subPDUs include at least a fourth MAC subPDU, the fourth MAC subPDU includes a first group MAC subheader and a group random access response RAR corresponding to the first group MAC subheader, the first group MAC subheader includes at least two first random access preamble identifiers RAPIDs, and the group RAR includes at least two RARs in a one-to-one correspondence with the at least two first RAPIDS;

parsing, by the terminal device, a MAC subheader included in each MAC subPDU; and determining, by the terminal device according to a result of parsing the MAC subheader, a MAC subPDU corresponding to the terminal device.

According to a fourteenth aspect, an embodiment of the present invention provides a terminal device, configured to perform the method according to the thirteenth aspect or any possible implementation of the thirteenth aspect. Specifically, the terminal device includes a module configured to perform the method according to the thirteenth aspect or any possible implementation of the thirteenth aspect.

According to a fifteenth aspect, an embodiment of the present invention provides a terminal device, and the terminal device includes a memory, a processor, and a transceiver. The memory is configured to store an instruction, and the processor is configured to execute the instruction stored in the memory. In addition, when the processor executes the instruction stored in the memory, the execution enables the processor to perform the method according to the thirteenth aspect or any possible implementation of the thirteenth aspect.

According to a sixteenth aspect, an embodiment of the present invention provides a computer readable medium, configured to store a computer program, where the computer program includes an instruction used to perform the method according to the thirteenth aspect or any possible implementation of the thirteenth aspect.

When the MAC PDU includes the fourth MAC subPDU, if the terminal device detects, in the MAC PDU, a RAPID that is the same as a RAPID of the terminal device, the terminal device may obtain a MAC subPDU of the terminal device based on a group MAC subheader. Therefore, according to this embodiment of this application, a new MAC PDU format can be introduced into random access in a 5G system to transmit a random access response, and this helps the terminal device rapidly obtain a random access response for the terminal device.

In this embodiment of this application, format types of the at least two RARs in the group RAR are the same. For the format type of the RAR, refer to the foregoing descriptions.

Optionally, the first group MAC subheader further includes second indication information for indicating format types of the at least two RARs in the group RAR corresponding to the first group MAC subheader, the format types of the at least two RARs in the group RAR are same, and the format type of the RAR corresponds to a random access event.

Optionally, the second indication information has a bit for indicating the format type of the RAR explicitly; or the second indication information is used to implicitly indicate that there is a correspondence between the first RAPID and the format type of the RAR.

Specifically, the access network device and the terminal device each may preconfigure a correspondence between a RAPID and a format type of a RAR. In this way, when determining a RAP that needs to be sent to the access network device, the terminal device may determine, based on the preconfigured correspondence between a RAPID and a RAR, a format type of a RAR corresponding to the terminal device. Further, the terminal device may parse at least one MAC subheader in the MAC PDU, and determine whether a RAPID obtained through parsing is the same as a RAPID sent by the terminal device, to determine whether the RAR is a random access response for the terminal device.

Optionally, the at least two MAC subPDUs further include a fifth MAC subPDU, the fifth MAC subPDU includes only a second group MAC subheader, the second group MAC subheader includes at least one second RAPID, and there is a correspondence between the second RAPID and one or more on-demand system information requests.

In other words, the second RAPID is used to indicate success in a random access procedure for using the second RAPID to request one or more pieces of on-demand system information corresponding to the second RAPID, or the second RAPID is used to indicate that the fifth MAC subPDU is an acknowledgement for the on-demand system information SI request.

Herein, one second RAPID may correspond to success in a random access procedure for requesting on-demand system information of one or more terminal devices. In other words, one terminal device may use one RAP to request on-demand system information, or a plurality of terminal devices may use a same RAP to request on-demand system information.

Herein, that the fifth MAC subPDU includes only a second group MAC subheader may be understood as follows: The fifth MAC subPDU includes the second group MAC subheader, and a format type of a RAR included in the fifth MAC subPDU is null.

If the terminal device detects, in the MAC PDU, the RAPID that is the same as the RAPID of the terminal device, the terminal device can obtain the acknowledgement for the on-demand system information SI request. Therefore, in this embodiment of this application, a new RAR format (to be specific, the RAR format may be null) can be added to the MAC PDU in response to the on-demand system information request of the terminal device, to be applicable to a scenario in which random access is used to request on-demand system information in a 5G system.

In addition, MAC subPDUs that are sent in a group-based manner are introduced into this embodiment of this application. In this case, MAC subheaders in which RARs of a same type are returned may be packetized together and then sent. In other words, format types of the at least two RARs in the fourth MAC subPDU are the same, and all RARs in the fifth MAC subPDU are null.

Optionally, in this embodiment of this application, when a RAPID has more than 6 bits, a plurality of RAPIDs in a group MAC subheader may be concatenated, to reduce bit overheads.

Optionally, the at least two MAC subPDUs further include a third MAC subPDU, the third MAC subPDU includes only a third MAC subheader, the third MAC subheader includes backoff indicator information for instructing the terminal device to determine a time interval to initiate a next random access request, when no random access response is detected or no RAPID that is the same as a RAPID sent by the terminal device in a detected MAC PDU.

Optionally, in this embodiment of this application, when a group MAC subheader including BIs exists, the plurality of BIs in the group MAC subheader may also be concatenated.

Optionally, in this embodiment of this application, the fifth MAC subPDU may be located before or after the fourth MAC subPDU, and the third MAC subPDU may be located before the MAC subPDUs (namely, the fourth MAC subPDU and the fifth MAC subPDU) including the RAPIDs.

According to a seventeenth aspect, a method for transmitting a random access response is provided, including:

determining, by an access network device, a Medium Access Control (MAC) protocol data unit PDU, where the MAC PDU includes at least one MAC subPDU, the MAC subPDU includes a MAC subheader, and the MAC subheader includes at least one RAPID; and sending, by the access network device, the MAC PDU.

According to an eighteenth aspect, an embodiment of the present invention provides an access network device, configured to perform the method according to the seventeenth aspect or any possible implementation of the seventeenth aspect. Specifically, the access network device includes a module configured to perform the method according to the seventeenth aspect or any possible implementation of the seventeenth aspect.

According to a nineteenth aspect, an embodiment of the present invention provides an access network device, and the access network device includes a memory, a processor, and a transceiver. The memory is configured to store an instruction, and the processor is configured to execute the instruction stored in the memory. In addition, when the processor executes the instruction stored in the memory, the execution enables the processor to perform the method according to the seventeenth aspect or any possible implementation of the seventeenth aspect.

According to a twentieth aspect, an embodiment of the present invention provides a computer readable medium, configured to store a computer program, where the computer program includes an instruction used to perform the method according to the seventeenth aspect or any possible implementation of the seventeenth aspect.

According to a twenty-first aspect, a method for transmitting a random access response is provided, including:

receiving, by a terminal device, a Medium Access Control (MAC) protocol data unit (PDU) sent by an access network device, where the MAC PDU includes at least one MAC subPDU, the MAC subPDU includes a MAC subheader, and the MAC subheader includes at least one RAPID;

parsing, by the terminal device, a MAC subheader included in each MAC subPDU; and determining, by the terminal device according to a result of parsing the MAC subheader, a MAC subPDU corresponding to the terminal device.

According to a twenty-second aspect, an embodiment of the present invention provides a terminal device, configured to perform the method according to the twenty-first aspect or any possible implementation of the twenty-first aspect. Specifically, the user equipment includes a module configured to perform the method according to the twenty-first aspect or any possible implementation of the twenty-first aspect.

According to a twenty-third aspect, an embodiment of the present invention provides a terminal device, and the terminal device includes a memory, a processor, and a transceiver.

The memory is configured to store an instruction, and the processor is configured to execute the instruction stored in the memory. In addition, when the processor executes the instruction stored in the memory, the execution enables the processor to perform the method according to the twenty-first aspect or any possible implementation of the twenty-first aspect.

According to a twenty-fourth aspect, an embodiment of the present invention provides a computer readable medium, configured to store a computer program, where the computer program includes an instruction used to perform the method according to the twenty-first aspect or any possible implementation of the twenty-first aspect.

Optionally, the MAC subPDU includes only a MAC subheader, and there is a correspondence between the RAPID and one or more on-demand system information requests.

Specifically, in this embodiment of this application, the MAC PDU may further include at least one MAC subPDU, the MAC subPDU includes a MAC subheader, and the MAC subheader includes at least one RAPID. In addition, when the MAC subPDU includes only the MAC subheader, the RAPID is used to indicate that the second MAC subPDU is an acknowledgement for the on-demand system information SI request. In this case, the MAC subPDU may be, for example, the second MAC subPDU or the fifth MAC subPDU described above.

Optionally, when there is one MAC subPDU, and the MAC subheader includes at least two RAPIDs, the MAC subPDU further includes at least two RARs in a one-to-one correspondence with the at least two RAPIDs, where format types of the at least two RARs are the same, and there is a correspondence between the format type of the RAR and an RA-RNTI.

In addition, the correspondence may be pre-stored in the access network device and the terminal device. When a specific RNTI can be used by the terminal device to monitor a PDCCH, the terminal device may determine a format type of a MAC subPDU in a PDSCH corresponding to the PDCCH. Further, the terminal device may obtain a random access response for the terminal device from the MAC PDU based on the format type of the MAC subPDU.

According to a twenty-fifth aspect, a communication chip is provided, where the communication chip stores an instruction, and when the communication chip runs on a communications apparatus, the communication chip performs the method according to any possible implementation of any one of the foregoing aspects.

DESCRIPTION OF EMBODIMENTS

Figure 1:
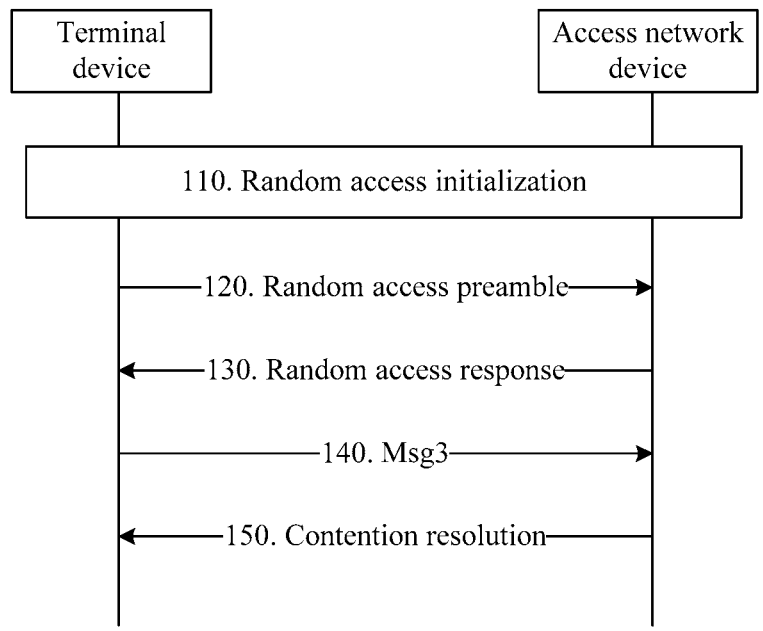
FIG. 1 is a schematic flowchart of a contention-based random access procedure according to an embodiment of this application.

The following describes the technical solutions in this application with reference to the accompanying drawings.

The technical solutions of embodiments of this application may be applied to various communications systems, for example, a Long Term Evolution (LTE) system, an LTE frequency division duplex (FDD) system, an LTE time division duplex (TDD) system, a future 5th Generation (5G) system or a New Radio (NR) system, and various evolved or converged systems. For example, a network device in the embodiments of this application may be a transmission point (TRP or TP) in the NR system, a gNB in the NR system, and one antenna panel or a group of antenna panels (including a plurality of antenna panels) of a base station in the 5G system. This is not particularly limited in the embodiments of this application.

A terminal device in the embodiments of this application is a device having a wireless transceiver function, including but not limited to user equipment, an access terminal, a subscriber unit, a subscriber station, a mobile station, a mobile console, a remote station, a remote terminal, a mobile device, a user terminal, a terminal, a wireless communications device, a user agent, or a user apparatus. Alternatively, the terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a drone device, a terminal device in smart household or a future 5G network, a terminal device in a future evolved public land mobile network (PLMN), or the like. This is not limited in the embodiments of this application.

The network device in the embodiments of this application may be a device configured to communicate with the terminal device. The network device may be an evolved NodeB (eNB or eNodeB) in an LTE system, or may be a radio controller in a cloud radio access network (CRAN) scenario. Alternatively, the network device may be a relay station, an access point, an in-vehicle device, a wearable device, a network device in a drone system, smart household, the Internet of Things, or a future 5G network, a network device in a future evolved PLMN, or the like. This is not limited in the embodiments of this application.

In the LTE system, a random access procedure usually needs to be performed in the following cases: A terminal device switches from an idle state to a connected state during initial access; or an RRC connection is re-established after a wireless connection is interrupted; or a terminal device needs to establish uplink synchronization with a target cell during handover; or when a terminal device is in a connected state but the terminal device is non-synchronized in an uplink, and uplink or downlink data arrives, uplink synchronization needs to be established through random access; or user positioning is performed based on uplink measurement; or when no dedicated scheduling request resource is allocated on a PUCCH, an uplink resource needs to be requested through random access.

With discussion of 5G NR, a new scenario may be introduced into random access. For example, a terminal device is in a non-synchronized state in an uplink when downlink data (DL data) arrives in an inactive state; or a terminal device is in a non-synchronized state when uplink data (UL data) arrives in an inactive state; or a terminal device requests on-demand system information (SI); or a terminal device sends a beam failure recovery request.

The inactive state is a new state introduced into 5G and the state is between the connected state and the idle state. In the inactive state, the terminal device is not connected to an access network device, but remains connected to a core network device. The terminal device stores all or a part of information required for connection establishment/restoration. Therefore, in the inactive state, when needing to establish a connection, the terminal device may rapidly establish/restore an RRC connection to a network based on the stored related information.

FIG. 1 is a schematic flowchart of a contention-based random access procedure according to an embodiment of this application. It should be understood that FIG. 1 shows steps or operations of the random access procedure, but these steps or operations are merely examples. Alternatively, in this embodiment of this application, other operations or variants of the operations in FIG. 1 may be performed. In addition, the steps in FIG. 1 may be performed in a sequence different from that presented in FIG. 1, and not all the operations in FIG. 1 may be necessarily performed.

110. Perform random access initialization.

A random access procedure is triggered by a PDCCH order, a MAC sublayer, or an RRC sublayer. If a terminal device receives a PDCCH transmission that is scrambled by using a C-RNTI and that is consistent with the PDCCH order, a random access procedure is triggered. The PDCCH order or an RRC message can indicate preamble indexes RA-Preamble Index (64 preamble indexes in total) and physical random access channel mask indexes RA-PRACH-Mask Index (16 PRACH mask indexes in total) that are used during resource selection in the random access procedure.

A preamble index and a physical layer are used to indicate a preamble used for random access. When a value of the preamble index is 000000, it indicates that the random access is initiated by the MAC sublayer. To be specific, the preamble is selected by the MAC sublayer, and correspondingly, contention-based random access is performed. When a value of the preamble index is not 000000, UE uses a preamble indicated by the preamble index to perform random access, to be specific, perform non-contention-based random access. The physical access channel mask index RA-PRACH-Mask Index is used to indicate a specific subframe in a system frame, where the terminal device may send a preamble on a PRACH corresponding to the subframe. The terminal device may search a correspondence table by using the RA-PRACH-Mask Index, to determine the preamble and an available physical resource.

Parameters need to be configured for the random access initialization, and these parameters include: a PRACH resource set (for example, a PRACH-Config Index) that may be used to transmit a random access preamble; an available random access preamble group (a group A or a group B) and an available preamble set in each group; a maximum quantity of preamble transmissions (preamble trans-Max); preamble initial received target power (preamble initial received target power); a power ramping step; a random access response window (RA-response window Size); a maximum quantity of message 3 (Msg3) HARQ retransmissions (max HARQ-Msg3); and a contention resolution timer (mac-contention Resolution Timer).

It should be noted that, before each random access procedure is triggered, all of the configured parameters can be updated through higher layer configuration. The terminal device performs the following operations after obtaining the parameters: flushing an Msg3 buffer; setting a quantity of preamble transmissions (PREAMBLE_TRANSMISSION_COUNTER) to 1; setting, to 0 ms, a backoff parameter value stored in the terminal device; and entering a random access resource selection phase.

It should be further noted that the terminal device performs only one random access procedure at any moment. If the terminal device receives a newly initiated random access request in a random access procedure, whether to continue the ongoing random access procedure or start a new random access procedure is determined through implementation on a terminal device side.

120. A terminal device sends a random access preamble to an access network device.

Specifically, the preamble is carried in a message 1 (Msg1). The preamble is mainly used to notify the access network device that there is a random access request, and enable the access network device to estimate a transmission delay between the access network device and the terminal device, so that the access network device can align uplink timing advance (uplink timing) and notify the terminal device of alignment information by using timing advance (timing advance command).

In this embodiment of this application, as a new random access scenario is introduced into a 5G NR system, random access may be further used for another request of the terminal device in the new scenario. For example, the preamble may be further used to instruct to send an on-demand system information (On-demand SI) request, or used to instruct to send a beam failure recovery request. This is not limited in this embodiment of this application.

Specifically, there may be a correspondence between the RAP and one or more on-demand SI requests, or there may be a correspondence between the RAP and one or more beam failure recovery requests. The terminal device may preconfigure the RAP, or receive the RAP configured by the access network device.

130. The terminal device receives a random access response (RA response, RAR) sent by the access network device.

Specifically, the terminal device may use a random access radio network temporary identifier (RA-RNTI) to monitor a PDCCH. Specifically, the following specifically describes how the terminal device determines the RA-RNTI. If the terminal device receives scheduling information for the terminal device, namely, downlink control information (DCI), the terminal device receives, on a PDSCH based on the DCI, a RAR message delivered by a network device. The DCI includes related content such as resource block (RB) allocation information and a modulation and coding scheme (MCS).

Specifically, the random access response is carried in a message 2 (Msg2). After sending the preamble, the terminal device monitors a corresponding PDCCH within the RAR response window based on an RA-RNTI value corresponding to the preamble. If a preamble carried in the response received by the terminal device is consistent with the preamble sent in the Msg1, the terminal device stops monitoring a RAR. Specifically, the access network device may send the RAR to the terminal device by using the physical downlink shared channel (PDSCH).

In this embodiment of this application, if a plurality of terminal devices send preambles on a same PRACH resource (which has a same time-frequency location and uses a same RA-RNTI), RARs corresponding to the plurality of terminal devices are encapsulated in a same MAC PDU. In addition, the MAC PDU may further include a backoff indicator (BI), and the backoff indicator is used by the terminal device to determine, when no preamble that is the same as a preamble of the terminal device is detected, a time interval to initiate a next random access request.

Figure 2:
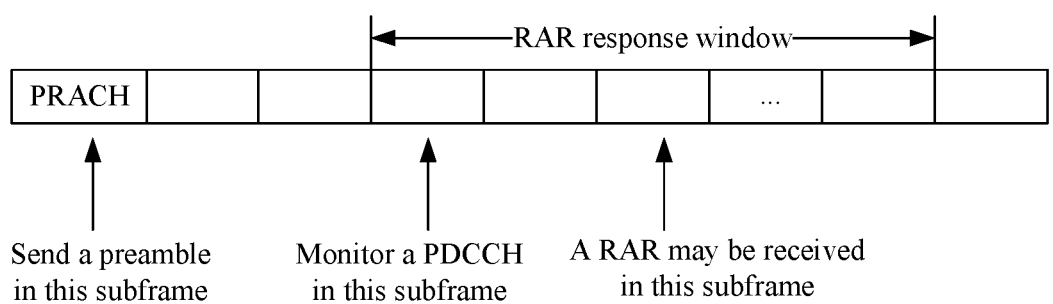
FIG. 2 is a schematic diagram of an RA response window according to an embodiment of this application.

FIG. 2 is a schematic diagram of an RA response window according to an embodiment of this application. Herein, the RAR response window starts at a third subframe after a subframe for sending a preamble, and lasts for RA-response window size subframes. It should be noted that, if a preamble occupies a plurality of subframes in time domain, a start location of the RA response window is calculated with reference to a last subframe.

Optionally, in the 5G NR system, the RAR response window starts at a fixed location after the subframe for sending a preamble, but a moment used to describe the fixed location may be another subframe, that is, may be another value different from 3. In addition, in this embodiment of this application, there may be another time unit different from a subframe.

If the terminal device receives no RAR within the RAR response window, or no preamble in the received RAR is consistent with the preamble of the terminal device, it is considered that current RAR reception fails. In this case, the terminal device needs to wait for a period of time before initiating random access again. The waiting time is a random value selected from a waiting time range specified by 0 to the BI.

In addition, in this embodiment of this application, in the new random access scenario introduced into the 5G NR system, a format of a random access response RAR may be different from an existing format of a RAR in an LTE system. For example, for a response to a request for on-demand system information, a format of a RAR may be null; or for a response to a request for beam failure recovery, a RAR may include more UL grants. The following describes in detail a new RAR format that may be introduced into the 5G NR system.

140. The terminal device sends an Msg3 to the access network device.

The terminal device sends, based on an uplink grant and TA information in the Msg2, the Msg3 to the access network device by using a physical uplink shared channel (PUSCH). Herein, a reason for which the message is referred to as an Msg3 instead of a specific message is that the message may be different depending on different states of the terminal device and different application scenarios. Therefore, these messages are collectively referred to as an Msg3, namely, a message 3.

The Msg3 may have the following several types: an RRC connection request, a tracking area data update, and a resource scheduling request. Specifically, the Msg3 is shown in Table 1:

TABLE 1

| Cause of random access | Message type | Terminal device identifier |
|---|---|---|
| Initial network access | RRC connection request | NAS terminal device ID (S-TMSI) or random number |
| RRC connection re-establishment | RRC connection re-establishment request | C-RNTI |
| Handover | Handover message | C-RNTI |
| Arrival of downlink data | C-RNTI MAC control element | C-RNTI |
| Arrival of uplink data | C-RNTI MAC control element | C-RNTI |

It should be noted that, because the access network device sends random access responses to a plurality of terminals in step 120, a random access response received by each terminal may be different, and accordingly, behavior of each terminal may be different. After detecting a RAR for each terminal, the terminal may send an Msg3 to the access network device based on specific content included in the RAR. In addition, when obtaining an acknowledgement corresponding to an on-demand system information request, the terminal does not send an Msg3, but monitors on-demand SI delivered by the access network device.

Optionally, an RNTI used for monitoring the on-demand SI and a monitoring manner may be fixed in a protocol or configured by the access network device, for example, is carried in minimum system information minimum SI or carried by using dedicated control signaling. The dedicated control signaling includes RRC signaling, a PDCCH, or a MAC CE.

150. The terminal device receives a contention resolution, namely, a message 4 Msg4, sent by the access network device.

Contention occurs when the plurality of terminal devices use a same preamble to initiate random access. A maximum of one terminal device in the terminal devices contending for a same resource can succeed in accessing. In this case, the access network device sends a contention resolution message to the terminal device by using the PDSCH.

Specifically, after sending the Msg3, the terminal device starts a contention resolution timer (mac-contention resolution Timer), and monitors the PDCCH by using a temporary C-RNTI indicated in the RAR or a C-RNTI preconfigured by the network device. If the terminal device receives, before the contention resolution timer expires, the contention resolution message sent by the access network device to the terminal device, it is considered that a random access procedure succeeds.

Therefore, as a new random access scenario is introduced into the 5G NR system, different random access scenarios may correspond to different random access responses RARs. In addition, an existing 5G standard has specified that an interleaved manner in which a MAC subheader and a payload are placed exists in a MAC PDU that is based on data and a MAC CE, and this is different from a conventional format design of a MAC PDU in LTE. From perspectives of different RAR types and MAC PDU format design rule consistency, a format of a MAC PDU that is based on random access in 5G needs to be changed.

Figure 3:
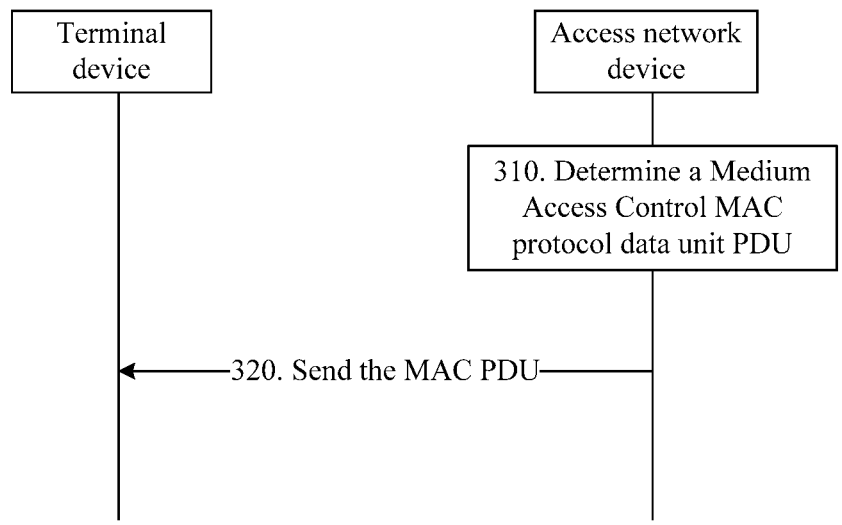
FIG. 3 is a schematic flowchart of a method for transmitting a random access response according to an embodiment of this application.

FIG. 3 is a schematic flowchart of a method for transmitting a random access response according to an embodiment of this application.

310. An access network device determines a Medium Access Control (MAC) protocol data unit PDU.

In this embodiment of this application, a new RAR format is introduced when random access is used to request on-demand system information or send a beam failure recovery request.

For example, a RAR corresponding to an on-demand system information request does not include information such as timing advance TA, an uplink grant (UL grant), and a temporary C-RNTI. In other words, the RAR is equivalent to 0 bits in this case. In other words, when random access of a terminal is used to request on-demand system information on-demand SI, a RAR is null, that is, a network device does not send a RAR to the terminal.

For another example, a RAR corresponding to the beam failure recovery request may carry more uplink grants UL grants.

For another example, in a handover scenario, because a handover command carries a C-RNTI, a RAR may not carry information such as a temporary C-RNTI.

Optionally, in this embodiment of this application, the MAC PDU may include at least two MAC subPDUs, the at least two MAC subPDUs include at least a first MAC subPDU, the first MAC subPDU includes a first MAC subheader and a random access response RAR corresponding to the first MAC subheader, and the first MAC subheader is located before the RAR corresponding to the first MAC subheader.

When the MAC PDU includes at least two first MAC subPDUs, a first MAC subheader and a RAR are placed in an interleaved manner. To be specific, each first MAC subPDU includes a first MAC subheader and a RAR corresponding to the first MAC subheader, and the first MAC subheader is located before and adjacent to the RAR corresponding to the first MAC subheader.

In this way, the MAC subheader and the RAR are placed in the interleaved manner, so that the MAC subheader can be immediately placed before the corresponding RAR, thereby changing a conventional MAC PDU format in random access in LTE. In addition, an existing 5G standard has specified that an interleaved manner in which a MAC subheader and a payload are placed exists in a MAC PDU that is based on data and a MAC CE. Therefore, according to this embodiment of this application, a format of a MAC PDU in random access in a 5G NR system can be uniform with a format of the MAC PDU that is based on data and a MAC CE in the existing 5G standard.

Optionally, in this embodiment of this application, the at least two MAC subPDUs may further include a second MAC subPDU, the second MAC subPDU includes only a second MAC subheader, the second MAC subheader includes a second RAPID, and there is a correspondence between the second RAPID and one or more on-demand system information requests. In other words, the second RAPID may be used to indicate success in sending, by using the second RAPID, the one or more on-demand system information requests corresponding to the second RAPID; or the second RAPID is used to indicate that the one or more on-demand system information SI requests corresponding to the second RAPID are successfully received; or the second RAPID may be used to indicate that the second MAC subPDU is an acknowledgement for the on-demand system information SI request.

Herein, one second RAPID may correspond to success in requesting on-demand system information for one or more terminal devices. In other words, one terminal device may use one RAP to request on-demand system information, or a plurality of terminal devices may use a same RAP to request on-demand system information.

Further, that the second MAC subPDU includes only a second MAC subheader may also be understood as follows: The second MAC subPDU includes the second MAC subheader, and a format type of a RAR included in the second MAC subPDU is null.

Optionally, in this embodiment of this application, the at least two MAC subPDUs further include a third MAC subPDU, the third MAC subPDU includes only a third MAC subheader, the third MAC subheader includes backoff indicator information, and the backoff indicator information is used to instruct the terminal device to determine, when no random access response is detected or no RAPID that is the same as a RAPID sent by the terminal device exists in a detected MAC PDU, a time interval to initiate a next random access request.

It should be noted that, in this embodiment of this application, the at least two MAC subPDUs included in the MAC PDU include at least the first MAC subPDU. In other words, at least one of the at least two MAC subPDUs is the first MAC subPDU including the first MAC subheader and the RAR. Moreover, in addition to the first MAC subPDU, the at least two MAC subPDUs may further include the second MAC subPDU including only the second MAC subheader. In addition, the at least two MAC subPDUs may further include a third MAC subPDU including a BI.

In an example, the MAC subPDUs may include two MAC subPDUs. One is the first MAC subPDU, and the other is the second MAC subPDU. In another example, the MAC subPDUs may include three MAC subPDUs: the first MAC subPDU, the second MAC subPDU, and the third MAC subPDU, respectively.

Optionally, in this embodiment of this application, the MAC PDU may further include at least one MAC subPDU, the MAC subPDU includes a MAC subheader, and the MAC subheader includes at least one RAPID. In addition, when the MAC subPDU includes only the MAC subheader, the RAPID is used to indicate that the second MAC subPDU is an acknowledgement for the on-demand system information SI request. In this case, the MAC subPDU may be, for example, the second MAC subPDU described above.

Figure 4:
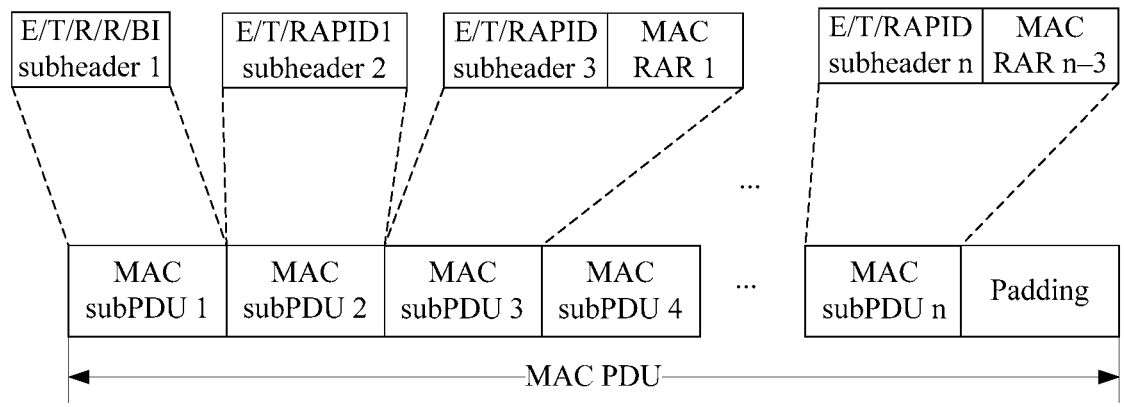
FIG. 4 is a schematic structural diagram of a MAC PDU according to an embodiment of this application.

FIG. 4 is a schematic structural diagram of a MAC PDU according to an embodiment of this application. It can be learned from FIG. 4 that the MAC PDU includes one or more MAC subPDUs. A MAC subPDU may include three types of MAC subPDUs: two types of MAC subPDUs (the first MAC subPDU and the second MAC subPDU, respectively) including RAPIDs and one type of MAC subPDU (the third MAC subPDU) including a BI, respectively.

Optionally, the MAC subPDU may further include padding (Padding).

It should be noted that, once the padding exists, the padding is located at the end of the MAC PDU, to be specific, the padding is located after a last MAC subPDU in the MAC PDU, and the padding has no corresponding MAC subheader. Whether the MAC PDU includes the padding and a length of the padding may be implicitly inferred based on a transport block (TB) and a quantity of all MAC subheaders and RARs.

Specifically, the MAC subPDUs including the RAPIDs may include the second MAC subPDU (namely, a MAC subPDU including only an E/T/RAPID subheader) and the first MAC subPDU (namely, a MAC subPDU including an E/T/RAPID subheader and a MAC RAR). Specifically, the E/T/RAPID subheader includes a RAPID. When detecting the MAC PDU, the terminal device may search a MAC header to determine whether there is a RAPID of the terminal device. When finding the RAPID of the terminal device in the MAC header, the terminal device stops monitoring.

The second MAC subPDU herein may be a response corresponding to an on-demand system information request, in other words, a RAR in the second MAC subPDU may be null. A RAPID 1 herein is reserved by the access network device for requesting the on-demand system information. One RAPID 1 may correspond to one or more on-demand system information requests. In addition, there may be one or more second MAC subPDUs. In this embodiment of this application, it may be understood that the RAPID 1 is a reserved RAPID.

The first MAC subPDU may be a response corresponding to another random access request. In addition, when there are a plurality of first MAC subPDUs, a MAC subheader and a MAC RAR are placed in an interleaved manner. To be specific, each first MAC subPDU includes a MAC subheader and a MAC RAR corresponding to the MAC subheader, and the MAC subheader is located before and adjacent to the RAR corresponding to the MAC subheader.

It may be understood that, in this embodiment of this application, the MAC PDU in FIG. 4 is merely an example of this embodiment of this application. A format of the MAC PDU in this embodiment of this application is not limited thereto. For example, alternatively, the MAC PDU may include only the second MAC subPDU, or may include only the first MAC subPDU.

In this embodiment of this application, the third MAC subPDU may include only an E/T/R/R/BI MAC subheader. Specifically, the E/T/R/R/BI MAC subheader includes a BI. When the terminal device does not find the RAPID of the terminal device in the MAC PDU, the terminal device may determine, based on the backoff indicator (BI) in the E/T/R/R/BI MAC subheader, a time interval to initiate a next random access request.

In other words, the third MAC subPDU is located before the first MAC subPDU and the second MAC subPDU, and the second MAC subPDU may be located before or after the first MAC subPDU. This is not limited in this embodiment of this application.

In this embodiment of this application, the second MAC subPDU may be located before the first MAC subPDU. The third MAC subPDU may be located before the MAC subPDUs (namely, the first MAC subPDU and the second MAC subPDU) including the RAPIDs.

Alternatively, the second MAC subPDU may be located before the third MAC subPDU. Correspondingly, the first MAC subPDU may be located after the third MAC subPDU.

It may be understood that, locations of the first MAC subPDU, the second MAC subPDU, and the third MAC subPDU in the MAC PDU are not limited in this embodiment of this application. In other words, the locations of the first MAC subPDU, the second MAC subPDU, and the third MAC subPDU may be combined in any manner. This is not limited in this embodiment of this application.

Figure 5:
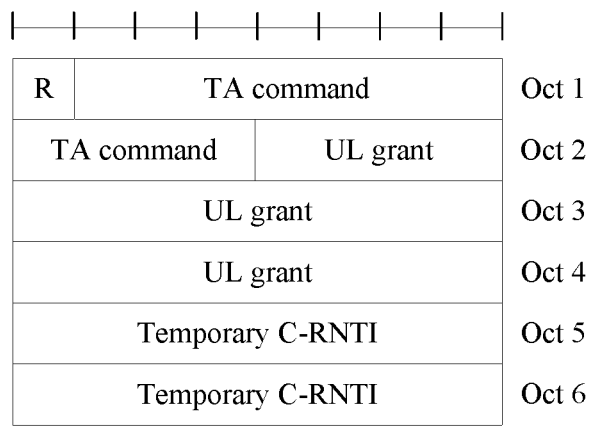
FIG. 5 is a schematic diagram of a RAR according to an embodiment of this application.
Figure 6:
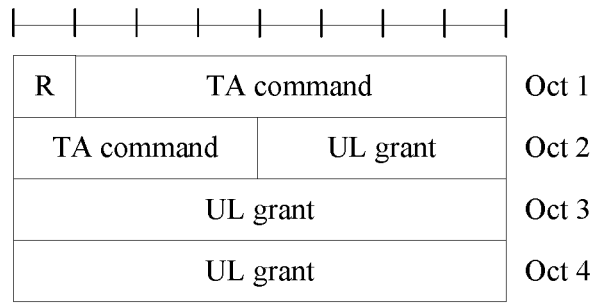
FIG. 6 is a schematic diagram of another RAR according to an embodiment of this application.
Figure 7:
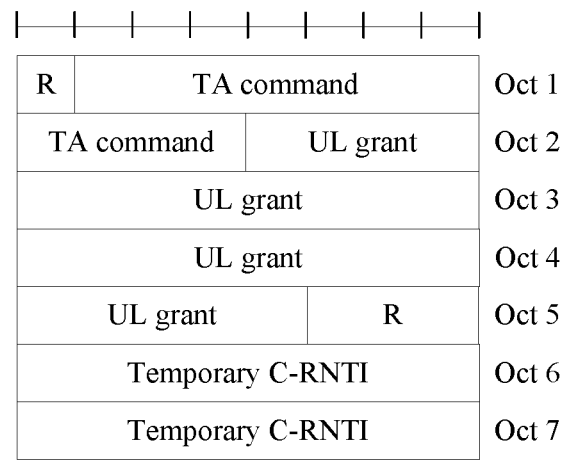
FIG. 7 is a schematic diagram of another RAR according to an embodiment of this application.

FIG. 5 is a schematic diagram of a RAR according to an embodiment of this application. The RAR may carry timing advance TA, an uplink resource grant (UL grant), a temporary cell radio network temporary identifier (temporary C-RNTI), and the like that are used to send an Msg3. It may be understood that, FIG. 5 is merely an example. A format type of the RAR in this embodiment of this application is not limited thereto. Optionally, as shown in FIG. 6, in this embodiment of this application, alternatively, the RAR may include no temporary C-RNTI. Alternatively, as shown in FIG. 7, the RAR may carry more uplink grants UL grants.

In this embodiment of this application, different random access events may correspond to different types of RARs. For example, a format type of a RAR corresponding to an existing random access event in LTE may be the same as an existing format of a RAR in LTE. In 5G NR, in a scenario in which a terminal is in a non-synchronized state in an uplink when downlink data (DL data) arrives in an inactive state, or a terminal is in a non-synchronized state in an uplink when uplink data (UL data) arrives in an inactive state, a RAR corresponding to a random access event may continue to use the existing format of the RAR in LTE. In 5G NR, a format type of a RAR corresponding to an event that a terminal device requests on-demand SI may be null. In 5G NR, a format type of a RAR corresponding to an event that a terminal device sends a beam failure recovery request may be a format type shown in FIG. 7, that is, includes more UL grants than the RAR format in LTE.

It may be understood that the existing format of the RAR in LTE includes a UL grant of 20 bits, while in this embodiment of this application, the format of the RAR corresponding to the event that the terminal device sends the beam failure recovery request includes more UL grants. To be specific, in this embodiment of this application, a length of a field in which the UL grant included in the RAR corresponding to the event that the terminal device sends the beam failure recovery request is located is greater than or equal to 20 bits.

In addition, the format type of the RAR in this embodiment of this application may be another RAR format type different from the existing format of the RAR in LTE. This is not limited in this embodiment of this application. For example, in a handover scenario, because a handover command carries a C-RNTI, a RAR may not carry information such as a temporary C-RNTI.

In this embodiment of this application, the UL grant may include:

a hopping flag, which occupies 1 bit and indicates whether there is hopping;

fixed size resource block assignment, which occupies 10 bits, where a RIV can be obtained after transformation of the fixed size resource block assignment;

a truncated modulation and coding scheme, which occupies 4 bits and indicates a modulation and coding rate;

a TPC command for a scheduled PUSCH, which occupies 3 bits and indicates relative power. An actual parameter f(i) in a power control formula for sending an Msg3 is the relative power plus (PREAMBLE_TRANSMISSION_COUNTER−1)×power_Ramping_Step, where PREAMBLE_TRANSMISSION_COUNTER is a quantity of preamble transmissions, and power_Ramping_Step is a power ramping step;

a UL delay, which occupies 1 bit. If the UL delay is 0, it indicates that the Msg3 is transmitted in an $(n+k)^{th}$ subframe. If the UL delay is 1, it indicates that the Msg3 is to be transmitted on a next occasion after the $(n+k)^{th}$ subframe, where n indicates a current frame in which an Msg2 is received, and k may be predefined or may be configured by the access network device. In an example, k may be obtained by searching the standard TS 36.321, as shown in Table 2. It should be noted that Table 2 is merely an example, and this embodiment of this application is not limited thereto; and a CSI request, which occupies 1 bit. If the CSI request is 0, it indicates that the CSI request is meaningless to contention-based random access; otherwise, the CSI request indicates a CQI. Optionally, different service requirements in 5G correspond to different scheduling requirements, and have different physical resource usage requirements. Therefore, a physical resource numerology is introduced into 5G the UL grant may indicate the physical resource attribute, and the terminal device may learn of the physical resource attribute after receiving the UL grant.

TABLE 2

| TDD UL/DL | DL subframe number n | | | | | | | | | |
|---|---|---|---|---|---|---|---|---|---|---|
| configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Specifically, the physical resource attribute may include at least one of the following attributes:

a resource period, which may be, for example, 1 ms, 2 ms, or 5 ms, or may be a length of one transmission time interval (TTI) or a length of two TTIs;

a TTI length, which may be, for example, a 1 ms TTI, a 0.5 ms TTI, or a TTI length of one orthogonal frequency division multiplexing (OFDM) symbol, or a TTI length of two OFDM symbols;

a subcarrier spacing (SCS), which may be, for example, 15 kHz or 60 kHz;

a carrier frequency carrier frequency;

a coding scheme, which may be a coding scheme such as a Turbo code, a low-density parity-check (LDPC) code, or a polar code;

a multiple access method, for example, OFDM or Code Division Multiple Access (CDMA);

a quantity of subcarriers occupied in frequency domain, for example, 12 subcarriers or 15 subcarriers may be occupied;

whether to perform frequency-domain repeated transmission, where if the frequency-domain repeated transmission is performed, a quantity of frequency-domain repeated transmissions further needs to be included;

whether to perform time-domain repeated transmission, where if the time-domain repeated transmission is performed, a quantity of time-domain repeated transmissions further needs to be included; and a transmission power indicator.

It may be understood that there may be at least one physical resource attribute. If there are too many physical resource usage attributes that need to be indicated in a UL grant (there are a large quantity of combinations), one-by-one indication causes excessive bit overheads, and therefore an indication index may be used to represent the physical resource usage attribute. A network device may configure, in an RRC message, a physical resource attribute index and specific physical resource attribute information corresponding to the physical resource attribute index. The physical resource attribute herein includes a TTI length and a subcarrier spacing. Assuming that there are two possible TTI lengths: a short TTI and a long TTI, and there are three possible subcarrier spacings: a subcarrier spacing 1, a subcarrier spacing 2, and a subcarrier spacing 3, six physical resource usage attribute indexes are required in total, as shown in Table 3:

TABLE 3

| Physical resource attribute index | TTI length | Subcarrier spacing |
|---|---|---|
| 1 | 1 | 1 |
| 2 | 1 | 2 |
| 3 | 1 | 3 |
| 4 | 2 | 1 |
| 5 | 2 | 2 |
| 6 | 2 | 3 |

The foregoing is merely an example. A specific quantity of indexes and a quantity of pieces of attribute information included in the physical resource usage attribute may alternatively be other values.

Optionally, a configuration of the physical resource attribute index and the specific physical resource attribute information corresponding to the physical resource attribute index may also be included in system information, a PDCCH, or a MAC CE.

In addition, the UL grant may indicate the physical resource attribute information in an explicit manner or an implicit manner. In the explicit manner, a specific bit field in the UL grant is used to indicate the physical resource attribute index. The terminal device can learn of the index after receiving the UL grant, and obtain the physical resource attribute by searching a correspondence between the physical resource attribute index and the specific physical resource attribute information or by searching for the specific physical resource attribute information corresponding to the index. For example, if the UL grant carries an index 3, the terminal device may determine, by searching the correspondence, that a TTI length is 1 and that a subcarrier spacing is 3. Alternatively, the UL grant indicates that a TTI length is 1 and that a subcarrier interval is 3. The explicit manner means that a MAC layer directly obtains the physical resource attribute index.

In the implicit manner, the UL grant has no specific bit to indicate the index, but the terminal device uses the UL grant to indicate a relationship between the physical resource attribute (which is at least one of a subcarrier spacing (SCS), a TTI length, and carrier information) and the index, and the MAC indirectly obtains the physical resource attribute index.

Specifically, there is a correspondence between the physical resource attribute index and information carried in the UL grant, and the information carried in the UL grant may indicate at least one of the subcarrier spacing SCS, the TTI length, and the carrier information.

The correspondence between the corresponding physical resource attribute index and the physical resource attribute indicated in the UL grant may be carried in the RRC message, the system information, the PDCCH, or the MAC CE, so that the MAC layer of the terminal device can obtain the UL grant, and the MAC indirectly obtains the physical resource attribute index based on the correspondence between the physical resource attribute index and the information carried in the UL grant.

Optionally, in the implicit manner, the UL grant has no specific bit to indicate the index, but the terminal device learns of, by monitoring the PDCCH, physical downlink control information DCI for scheduling a MAC RAR PDU in which the UL grant is located, or content carried in the DCI, to determine the physical resource attribute index. The content in a format of the DCI includes at least one of power control information, resource type information, resource block indication information, a modulation and coding scheme, a TTI length, a subcarrier spacing, a carrier frequency, and the like.

Specifically, there is a correspondence between a physical resource attribute index and a DCI format. Alternatively, there is a correspondence between a physical resource attribute index and DCI indication information.

The DCI format includes a DCI format 1A or a DCI format 1C. It may be understood that there may be another new DCI format in 5G.

The correspondence between a corresponding index and a DCI format or between an index and content in the DCI may be carried in the RRC message, the system information, the PDCCH, or the MAC CE, so that a physical layer of the terminal device can determine the physical resource attribute index based on the DCI in the detected PDCCH and the correspondence between the physical resource attribute index and the DCI format or the correspondence between the physical resource attribute index and the DCI indication information. The physical layer reports the physical resource attribute index to the MAC layer, and the MAC layer learns of the information, and then uses the information to perform an operation such as internal scheduling or resource allocation.

Optionally, if there are a small quantity of physical resource attribute combinations, the index does not need to be introduced, and the access network device does not need to preconfigure the correspondence between the physical resource attribute index and the specific physical resource attribute.

In this case, a manner of obtaining the physical resource attribute information required by the MAC layer may be as follows: The MAC directly obtains the specific physical resource attribute information by using the indication information in the UL grant. Alternatively, the physical layer descrambles the PDCCH, and determines the specific physical resource attribute based on the DCI indication information. The physical layer reports, to the MAC layer, the physical resource attribute information required by the MAC, and the MAC layer learns of the information, and then uses the information to perform an operation such as internal scheduling or resource allocation.

Before determining specific physical resource attributes that are indicated by the UL grant, the access network device further receives the Msg1 sent by the terminal device. The Msg1 may carry information that assists the access network device in determining whether the UL grant carries the physical resource attribute. Specifically, the physical resource attribute may be indicated by using a random access resource used for sending the Msg1: at least one of a time domain resource, a frequency domain resource, and a code domain resource. The frequency domain resource may be a physical random access resource for sending the Msg1, for example, a PRACH, and the code domain resource may be a preamble for sending the Msg1, for example, a preamble. Alternatively, the physical resource attribute may be indicated in an Msg1 sending manner, for example, a quantity of Msg1 allowed to be sent before a RAR receiving window ends.

In addition, the access network device may configure, in control information, a correspondence between the physical resource attribute information and the random access resource used for sending the Msg1 or a correspondence between the Msg1 sending manner and the physical resource attribute.

The control information includes the RRC message, the PDCCH, or the MAC CE.

It may be understood that, when the terminal device is in an idle state, to be specific, does not receive the control information yet, the terminal device cannot use the Msg1 to carry the information that assists the access network device in determining whether the UL grant carries the physical resource attribute information. In this case, the access network device may use the UL grant to indicate a default numerology, namely, a default numerology.

When the terminal device is in a connected state, if the access network device configures a correspondence between the random access resource used for sending the Msg1 and different physical resource attributes/physical resource attribute indication information, the access network device may distinguish between UL grants allocated for different Msg1. In other words, the UL grants may indicate different physical resource attributes/physical resource attribute indication information.

When the terminal device is in a connected state, if the access network device does not configure a correspondence between the random access resource used for sending the Msg1 and different physical resource attributes/physical resource attribute indication information, a possible manner in which the access network device determines how to indicate the physical resource usage attribute or the physical resource usage attribute index in the UL grant includes: depending on implementation by the access network device; or indicating, by the access network device, a default physical resource usage attribute or physical resource usage attribute index in the UL grant.

Figure 8:
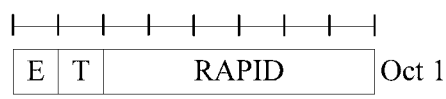
FIG. 8 is a schematic diagram of a MAC subheader including a RAPID according to an embodiment of this application.
Figure 9:
FIG. 9 is a schematic diagram of a MAC subheader including a BI according to an embodiment of this application.

FIG. 8 is a schematic diagram of a MAC subheader (namely, a first MAC subheader or a second MAC subheader) including a RAPID according to an embodiment of this application. FIG. 9 is a schematic diagram of a MAC subheader (namely, a third MAC subheader) including a BI according to an embodiment of this application. The following explains fields in each MAC subheader in FIG. 8 and FIG. 9.

E: An extension field indicates whether there is another MAC subheader in a MAC PDU. If E is set to 1, it indicates that the MAC subPDU is followed by a MAC subheader including a BI or a RAPID. Otherwise, E is set to 0, it indicates that a next octet (Oct) is no longer a MAC subheader.

T: A type indicator indicates whether a MAC subheader includes a random access preamble identifier RAPID or a backoff indicator BI. If T is set to 0, it indicates that the MAC subheader includes a BI. Otherwise, T is set to 1, it indicates that the MAC subheader includes a RAPID.

R: Reserved bit.

RAPID: A random access preamble identifier may be 6 bits in an LTE system, and a RAPID may be added in an NR system. Bits corresponding to the field may be extended.

BI: A backoff indicator indicates load of a cell, and may be 4 bits. A corresponding backoff parameter may be obtained through a table lookup by using the field. Table 4 shows a correspondence between an index and a backoff parameter value in this embodiment of this application. In addition, bits corresponding to the field may be extended. It should be noted that Table 4 is merely an example. Bits required by the index, the corresponding backoff parameter value, and a backoff unit (such as ms or TTI) in this embodiment of this application are not limited thereto.

TABLE 4

| Index | Backoff parameter value (ms) |
| --- | --- |
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

It should be noted that the corresponding MAC subheaders in FIG. 8 and FIG. 9 include common fields E and T, and changes of bits in the two fields may keep consistent. In other words, neither or both of the MAC subheaders in FIG. 8 and FIG. 9 include the E field. Correspondingly, neither or both of the MAC subheaders in FIG. 8 and FIG. 9 include the T field.

Optionally, in this embodiment of this application, a possible change of bits in the T field is 1 bit or 2 bits. A possible change of bits in the RAPID field is 6 bits to 8 bits. A possible change of bits in the BI field is 4 bits to 6 bits.

Correspondingly, the MAC subheaders may have the following two cases.

Case 1: The E field is reserved, and the T field has 1 bit.

Figure 10:
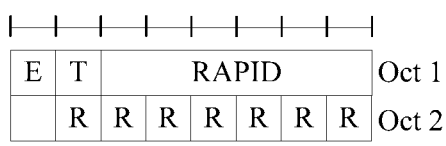
FIG. 10 is a schematic diagram of a MAC subheader having a RAPID of 7 bits according to an embodiment of this application.
Figure 11:
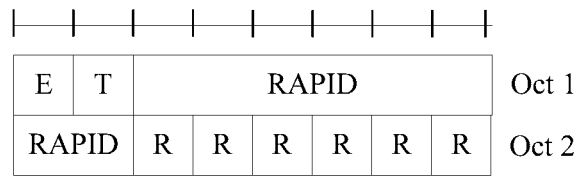
FIG. 11 is a schematic diagram of a MAC subheader having a RAPID of 8 bits according to an embodiment of this application.

Specifically, the RAPID in the first MAC subheader or the second MAC subheader may be 6 bits, 7 bits, or 8 bits. The RAPID in the MAC subheader shown in FIG. 8 is 6 bits. FIG. 10 and FIG. 11 are schematic diagrams of MAC subheaders having RAPIDs of 7 bits and 8 bits, respectively. It can be learned that, in Case 1, when the RAPID is 6 bits, the MAC subheader is one octet (Oct); or when the RAPID is 7 bits or 8 bits, the MAC subheader is two octets, and the corresponding RAPID occupies a first bit or the first two bits in a second octet of the MAC subheader.

Figure 12:
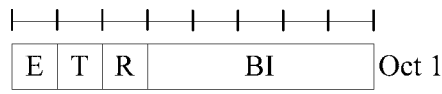
FIG. 12 is a schematic diagram of a MAC subheader having a BI of 5 bits according to an embodiment of this application.
Figure 13:
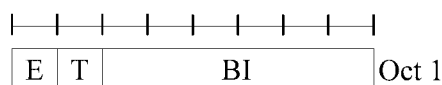
FIG. 13 is a schematic diagram of a MAC subheader having a BI of 6 bits according to an embodiment of this application.

The BI in the third MAC subheader may be 4 bits, 5 bits, or 6 bits. The BI in the MAC subheader shown in FIG. 9 is 4 bits. FIG. 12 and FIG. 13 are schematic diagrams of MAC subheaders having BIs of 5 bits and 6 bits, respectively. It can be learned that, in Case 1, the MAC subheader including the BI occupies one octet.

In addition, 5G has diversified service requirements. In 3GPP TR 38.913, 5G application scenarios are divided into three types, which are Enhanced Mobile Broadband (eMBB), massive machine type communications (mMTC), and ultra-reliable and low latency communications (URLLC), respectively. In this embodiment of this application, if random access is initiated due to a URLLC service, a delay of the random access needs to be as short as possible. Considering that priorities of different random access scenarios need to be distinguished in NR, different random access services may be provided based on different priorities.

Priorities of the random access are divided based on an event of the random access initiated by the terminal device. The random access event includes a service type of the random access, whether the random access is used for initial transmission of a message or retransmission of a message, or the like. Alternatively, priorities of the random access may be divided based on quality of service (QoS) of the random access initiated by the terminal device. For example, the access network device sets random access with relatively high QoS to a high priority, and sets random access with relatively low QoS to a low priority.

Alternatively, priorities of the random access may be divided based on a physical resource numerology selected for the random access initiated by the terminal device. The physical resource attribute includes at least one of the following attributes: a resource period, a TTI length, a subcarrier spacing, a coding scheme, a multiple access method, a quantity of subcarriers occupied in frequency domain, whether to perform frequency-domain repeated transmission, and whether to perform time-domain repeated transmission.

For example, the access network device divides the priorities of the random access based on a resource period of 1 ms, 2 ms, or 5 ms or based on a resource period with a length of one transmission time interval (TTI) or with a length of two TTIs. For another example, the access network device divides the priorities of the random access based on a 1 ms TTI, a 0.5 ms TTI, a TTI length of one orthogonal frequency division multiplexing (OFDM) symbol, or a TTI length of two OFDM symbols. For another example, the access network device divides the priorities of the random access based on a subcarrier spacing of 15 kHz or 60 kHz. For another example, the access network device divides the priorities of the random access based on a coding scheme using a Turbo code, a low-density parity-check (LDPC) code, or a polar code. For another example, the access network device divides the priorities of the random access based on OFDM or a multiple access method of code division multiple access (CDMA). For another example, the access network device divides the priorities of the random access based on 12 subcarriers or 15 subcarriers occupied in frequency domain.

In addition, for random access for frequency-domain repeated transmission, the access network device may further divide the priorities of the random access based on the quantity of frequency-domain repeated transmissions. For random access for time-domain repeated transmission, the access network device may further divide the priorities of the random access based on the quantity of time-domain repeated transmissions.

Alternatively, the priorities of the random access may be divided based on a preamble used for the random access and/or a physical random access channel (PRACH) for sending the random access preamble.

It may be understood that, the priorities of the random access may alternatively be divided in a plurality of levels with reference to the foregoing plurality of division manners.

The foregoing priority information may be specified in a protocol, or may be sent by a network device to the terminal device by using a control information. The control information includes system information, an RRC message, a PDCCH message, or a MAC CE.

In this embodiment of this application, different random access priorities may correspond to different backoff indicators BIs. In this case, there may be one or more MAC subPDUs including a BI. For example, a relatively small BI may be set for random access of a relatively high priority, to reduce a waiting time required for re-initiating random access. In this case, a reserved bit R in an E/R/R/BI MAC subheader may be used to indicate a random access priority.

Optionally, one or more bits may be selected from reserved bits R to indicate a random access priority. In an example, any bit may be selected from the reserved bits R to indicate the random access priority. For example, if the priority bit is 0, it indicates that the random access priority is 1. If the priority bit is 1, it indicates that the random access priority is 2. In another example, two reserved bits may be used to indicate the random access priority. For example, 00, 01, 10, and 11 may indicate random access priorities 1, 2, 3, and 4, respectively.

Case 2: The E field is not reserved, and the T field has 1 bit.

Specifically, the RAPID in the first MAC subheader or the second MAC subheader may be 6 bits, 7 bits, or 8 bits. When the RAPID is 6 bits, 7 bits, or 8 bits, the T field may be located in a first bit or a second bit in the octet, and fields other than the T field and the RAPID may be reserved. In addition, in Case 2, when the RAPID is 6 bits or 7 bits, a MAC subheader is one octet. When the RAPID is 8 bits, the MAC subheader is two octets, and the RAPID occupies a first bit in a second octet of the MAC subheader.

The BI in the third MAC subheader may be 4 bits, 5 bits, 6 bits, or 7 bits. When the BI is 4 bits, 5 bits, 6 bits, or 7 bits, the T field may be located in a first bit in the octet, and fields other than the T field and the BI may be reserved. In addition, in Case 2, the MAC subheader including the BI occupies one octet.

Optionally, one or more bits may be selected from reserved bits R to indicate a random access priority. In an example, any bit may be selected from the reserved bits R to indicate the random access priority. For example, if the priority bit is 0, it indicates that the random access priority is 1. If the priority bit is 1, it indicates that the random access priority is 2. In another example, any two reserved bits may be used to indicate the random access priority. For example, 00, 01, 10, and 11 may indicate random access priorities 1, 2, 3, and 4, respectively. Alternatively, in another example, three reserved bits may be used to indicate the random access priority. For example, 000, 001, 010, 011, 100, 101, 110, and 111 may indicate random access priorities 1 to 8, respectively.

It should be noted that in the same case as described above (for example, in Case 1 or Case 2), the MAC subheader including the BI and the MAC subheader including the RAPID may be combined in any manner, to replace MAC subheaders at corresponding locations in the MAC PDU. However, in a different case, the MAC subheader including the BI and the MAC subheader including the RAPID cannot appear at corresponding locations in the MAC PDU at the same time.

Figure 14:
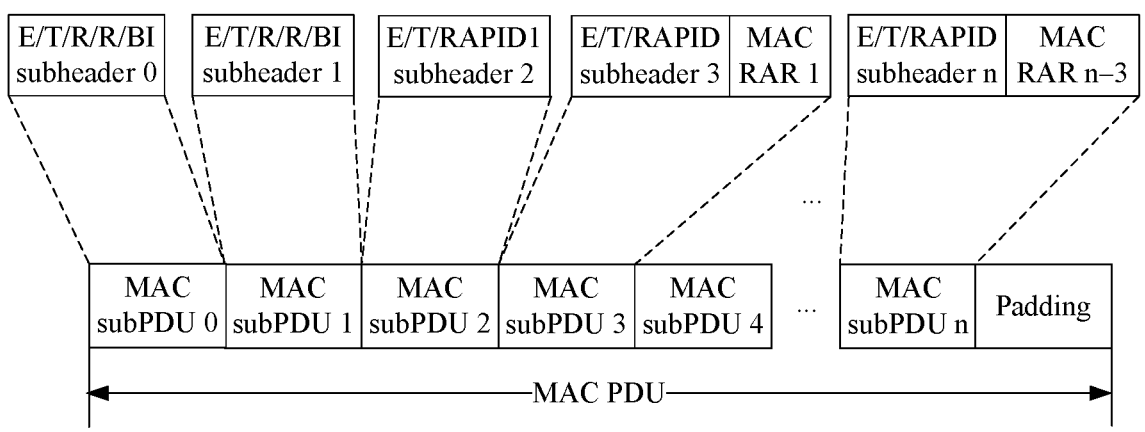
FIG. 14 is a schematic diagram of another MAC PDU according to an embodiment of this application.

In addition, if third MAC subheaders for distinguishing between priorities are used, N MAC subheaders including BIs may appear in the MAC PDU, where N is a positive integer greater than or equal to 1. FIG. 14 is a schematic diagram of a MAC PDU including two MAC subheaders including BIs.

Figure 15:
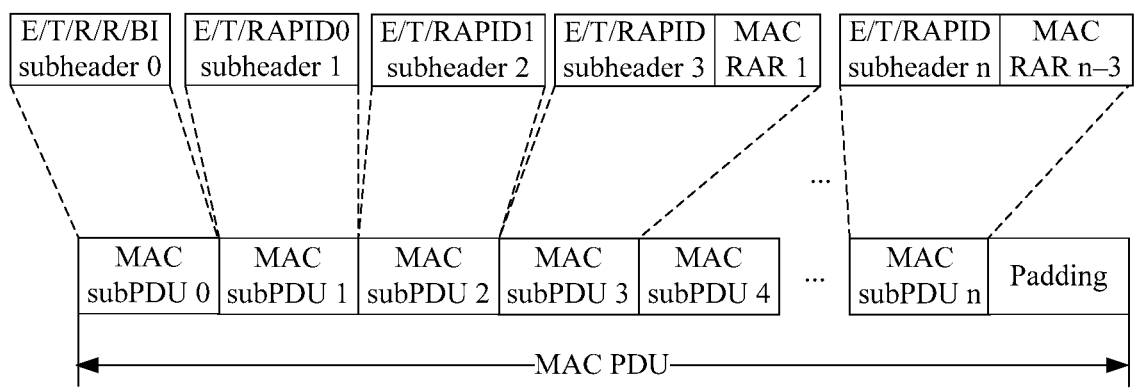
FIG. 15 is a schematic diagram of another MAC PDU according to an embodiment of this application.

Likewise, the MAC PDU may include M first MAC subPDUs, where M is a positive integer greater than or equal to 1. FIG. 15 is a schematic diagram of a MAC PDU including two MAC subheaders including reserved RAPIDs, where a RAPID 1 and a RAPID 2 are reserved RAPIDs.

It should be noted that, when at least one of M and N is greater than 1, the MAC subheader including the BI and the MAC subheader including the reserved RAPID need to include the E field.

Optionally, in this embodiment of this application, the first MAC subheader further includes first indication information, and the first indication information is used to indicate a format type of a RAR corresponding to the first MAC subheader. The format type of the RAR may be one of the different types in FIG. 6, FIG. 7, and FIG. 8, or may be another format type different from the format type in FIG. 6, FIG. 7, or FIG. 8. This is not limited in this embodiment of this application.

In an example, the first indication information has a bit for indicating the format type of the RAR explicitly. Specifically, the first indication information may occupy one or more reserved bits in the MAC subheader.

In another example, the first indication information is used to implicitly indicate that there is a correspondence between the RAPID in the first MAC subheader and the format type of the RAR. Specifically, the access network device and the terminal device each may preconfigure a correspondence between a RAPID and a format type of a RAR. In this way, when determining a RAP that needs to be sent to the access network device, the terminal device may determine, based on the preconfigured correspondence between a RAPID and a RAR, a format type of a RAR corresponding to the terminal device. Further, the terminal device may parse at least one MAC subheader in a MAC PDU based on a RAPID, to obtain a random access response for the terminal device.

Optionally, in this embodiment of this application, the MAC PDU includes at least two MAC subPDUs, the at least two MAC subPDUs include at least a fourth MAC subPDU, the fourth MAC subPDU includes a first group MAC subheader and a group random access response RAR corresponding to the first group MAC subheader, the first group MAC subheader includes at least two first random access preamble identifiers RAPIDs, and the group RAR includes at least two RARs in a one-to-one correspondence with the at least two first RAPIDs.

In this embodiment of this application, format types of the at least two RARs in the group RAR are the same. Specifically, for the format type of the RAR, refer to the foregoing descriptions. To avoid repetition, details are not described herein again.

Optionally, in this embodiment of this application, the at least two MAC subPDUs further include a fifth MAC subPDU, the fifth MAC subPDU includes only a second group MAC subheader, the second group MAC subheader includes at least one second RAPID, and there is a correspondence between the second RAPID and one or more on-demand system information requests. In other words, the second RAPID is used to indicate success in sending, by using the second RAPID, the one or more on-demand system information requests corresponding to the second RAPID; or the second RAPID is used to indicate that the second MAC subPDU is an acknowledgement for the on-demand system information SI request.

Herein, one second RAPID may correspond to success in requesting on-demand system information for one or more terminal devices. In other words, one terminal device may use one RAP to request on-demand system information, or a plurality of terminal devices may use a same RAP to request on-demand system information.

Herein, that the fifth MAC subPDU includes only a second group MAC subheader may be understood as follows: The fifth MAC subPDU includes the second group MAC subheader, and a format type of a RAR included in the fifth MAC subPDU is null.

Herein, MAC subPDUs that are sent in a group-based manner are introduced. In this case, MAC subheaders in which RARs of a same type are returned may be packetized together and then sent. In other words, format types of the at least two RARs in the fourth MAC subPDU are the same, and all RARs in the fifth MAC subPDU are null.

In this embodiment of this application, the fifth MAC subPDU may be located before or after the fourth MAC subPDU. The third MAC subPDU may be located before the MAC subPDUs (namely, the fifth MAC subPDU and the fourth MAC subPDU) including the RAPIDs.

Alternatively, the fifth MAC subPDU may be located before the third MAC subPDU. Correspondingly, the fourth MAC subPDU may be located after the third MAC subPDU.

It may be understood that, locations of the third MAC subPDU, the fourth MAC subPDU, and the fifth MAC subPDU in the MAC PDU are not limited in this embodiment of this application. In other words, the locations of the third MAC subPDU, the fourth MAC subPDU, and the fifth MAC subPDU may be combined in any manner. This is not limited in this embodiment of this application.

Figure 16:
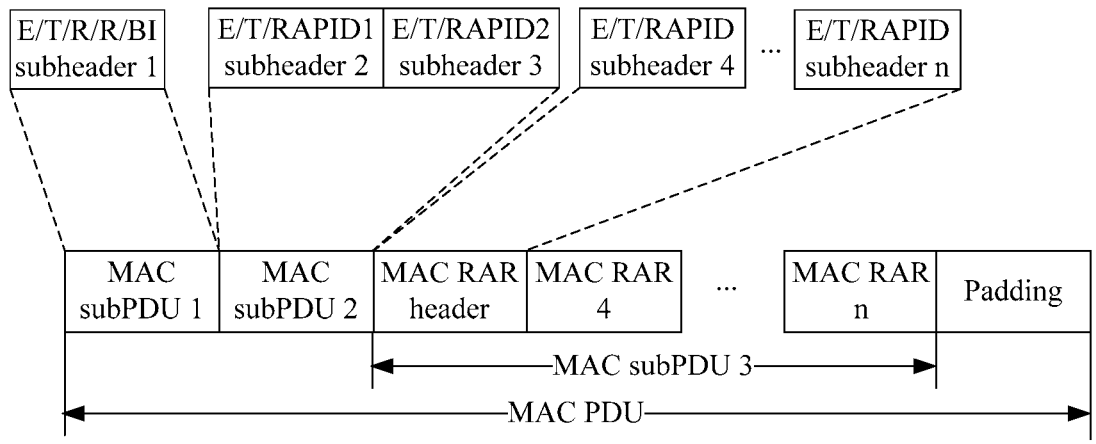
FIG. 16 is a schematic structural diagram of another MAC PDU according to an embodiment of this application.

FIG. 16 is a schematic structural diagram of another MAC PDU according to an embodiment of this application. It can be learned from FIG. 16 that the MAC PDU includes one or more MAC subPDUs. A MAC subPDU may include three types of MAC subPDUs: two types of MAC subPDUs (the fourth MAC subPDU and the fifth MAC subPDU) including RAPIDs and one type of MAC subPDU (the third MAC subPDU) including a BI, respectively. Optionally, the MAC subPDU may further include padding.

Different from the MAC PDU shown in FIG. 4, the MAC subPDU shown in FIG. 16 may include a plurality of MAC subheaders, or may include a plurality of MAC subheaders and a plurality of MAC RARs in a one-to-one correspondence with the MAC subheaders. Herein, a plurality of MAC subheaders included in one MAC subPDU may be referred to as a group MAC subheader or a MAC RAR header, and the plurality of MAC RARs in the MAC subPDU are referred to as a group-based MAC RAR.

For example, a MAC subPDU 2 may include an E/T/RAPID 1 subheader 2 and an E/T/RAPID 2 subheader 3. Alternatively, a MAC subPDU 3 may include an E/T/RAPID subheader 4 to an E/T/RAPID subheader n, and a MAC RAR 4 to a MAC RAR n.

Specifically, for descriptions of the MAC subheader and the MAC RAR in FIG. 16, refer to the foregoing descriptions. To avoid repetition, details are not described herein again.

Figure 17:
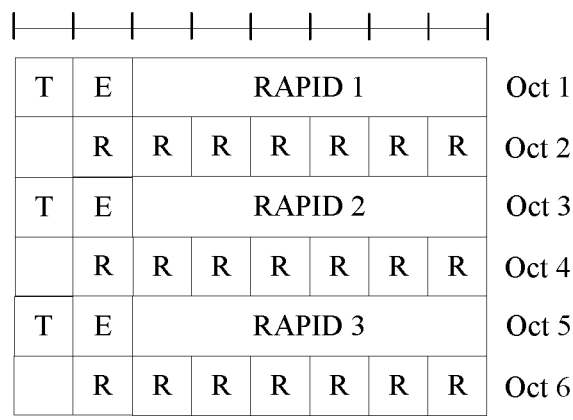
FIG. 17 is a schematic diagram of a MAC RAR header (namely, a group MAC subheader) according to an embodiment of this application.

FIG. 17 is a schematic diagram of a MAC RAR header (namely, a group MAC subheader) according to an embodiment of this application. The MAC RAR header in FIG. 17 includes three MAC subheaders, and the three MAC subheaders include a RAPID 1, a RAPID 2, and a RAPID 3, respectively. It can be learned that each MAC subheader occupies two octets, and the RAPIDs included in the MAC subheaders each occupy 7 bits. It can be learned that a plurality of reserved bits exist in the MAC RAR header shown in FIG. 17, and this causes a waste of bits in the MAC PDU.

Optionally, in this embodiment of this application, when a RAPID has more than 6 bits, a plurality of RAPIDs in a group MAC subheader may be concatenated, to reduce bit overheads.

Figure 18:
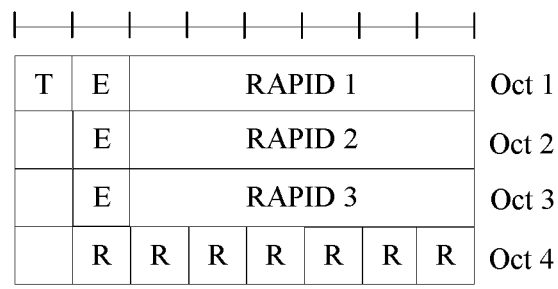
FIG. 18 is a schematic diagram of another MAC RAR header (namely, a group MAC subheader) according to an embodiment of this application.
Figure 19:
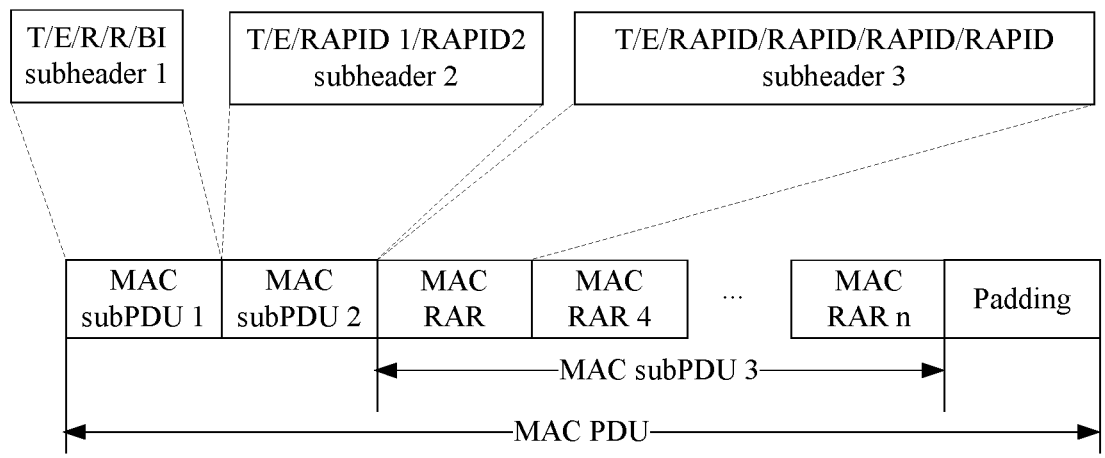
FIG. 19 is a schematic diagram of a MAC PDU in which a plurality of RAPIDs are concatenated according to an embodiment of this application.

FIG. 18 is a schematic diagram of another MAC RAR header (namely, a group MAC subheader) according to an embodiment of this application. Because types of a plurality of RARs corresponding to the group MAC subheader in this embodiment of this application are the same, only one T field may be reserved in the MAC RAR header. In this case, a last bit of a RAPID 1 in a first MAC subheader in the MAC RAR header may be followed by an E field and a RAPID 2 of a second MAC subheader, and a last bit of the RAPID 2 in the second MAC subheader may be followed by an E field and a RAPID 3 of a third MAC subheader. In this way, the MAC RAR header shown in FIG. 18 occupies only four octets, and remaining bits are reserved. Correspondingly, FIG. 19 is a schematic diagram of a MAC PDU in which a plurality of RAPIDs are concatenated according to an embodiment of this application.

Optionally, in this embodiment of this application, when a group MAC subheader including BIs exists, the plurality of BIs in the group MAC subheader may also be concatenated.

Optionally, in this embodiment of this application, the fourth MAC subheader further includes second indication information for indicating format types of the at least two RARs in the group RAR corresponding to the first group MAC subheader. Specifically, for the format type of the RAR, refer to the foregoing descriptions. To avoid repetition, details are not described herein again.

In an example, the second indication information has a bit for indicating the format type of the RAR explicitly. Specifically, the second indication information may occupy one or more reserved bits in the group MAC subheader.

In addition, when the group MAC subheader is in a structure in FIG. 18, the group MAC subheader may have only one of the foregoing bits. When the group MAC subheader is in a structure in FIG. 17, each MAC subheader in the group MAC subheader may have one of the foregoing bits.

In another example, the second indication information is used to implicitly indicate that there is a correspondence between the RAPIDs in the first group MAC subheader and the format type of the RAR. Specifically, the access network device and the terminal device each may preconfigure a correspondence between a RAPID and a format type of a RAR. In this way, when determining a RAP that needs to be sent to the access network device, the terminal device may determine, based on the preconfigured correspondence between a RAPID and a RAR, a format type of a RAR corresponding to the terminal device. Further, the terminal device may parse at least one MAC subheader in the MAC PDU, and determine whether a RAPID obtained through parsing is the same as a RAPID sent by the terminal device, to determine whether the RAR is a random access response for the terminal device.

Optionally, in this embodiment of this application, the MAC PDU may further include at least one MAC subPDU, the MAC subPDU includes a MAC subheader, and the MAC subheader includes at least one RAPID. When the MAC subPDU includes only the MAC subheader, the RAPID is used to indicate success in sending, by using the second RAPID, the one or more on-demand system information requests corresponding to the second RAPID. In this case, for example, the MAC subPDU may be the foregoing fifth MAC subPDU.

Optionally, in this embodiment of this application, when there is one MAC subPDU, and the MAC subheader includes at least two RAPIDs, the MAC subPDU further includes at least two RARs in a one-to-one correspondence with the at least two RAPIDs, where format types of the at least two RARs are the same.

In this case, there is a correspondence between the MAC subPDU and an RNTI used for parsing the MAC subPDU. The RNTI may be an RA-RNTI and correspondingly used for decoding a RAR. Alternatively, an RNTI may be configured for a MAC subPDU corresponding to on-demand SI.

In other words, in this embodiment of this application, for different types of MAC subPDUs, the access network device may preconfigure a correspondence between an RNTI and a MAC subPDU type, and the correspondence may be pre-stored in the access network device and the terminal device. When a specific RNTI can be used by the terminal device to monitor a PDCCH, the terminal device may determine a format type of a MAC subPDU in a PDSCH corresponding to the PDCCH. Further, the terminal device may obtain a random access response for the terminal device from the MAC PDU based on the format type of the MAC subPDU. Specifically, for the format type of the RAR, refer to the foregoing descriptions. To avoid repetition, details are not described herein again.

320. The access network device sends the MAC PDU.

In this embodiment of this application, when a plurality of terminal devices send preambles on a same PRACH resource, RARs corresponding to the plurality of terminal devices are encapsulated in a same MAC PDU. In this case, the access network device sends the MAC PDU to the plurality of terminal devices.

In this case, the terminal device receives the MAC PDU sent by the access network device, and the MAC PDU includes at least two MAC subPDUs. The terminal device parses a MAC subheader included in each MAC subPDU, and determines, based on a result of parsing the MAC subheader, a MAC subPDU corresponding to the terminal device. Herein, the at least two MAC subPDUs in the MAC PDU may be different types of MAC subPDUs.

Optionally, the MAC subheader included in the MAC subPDU carries indication information, and the indication information indicates a type of the MAC subPDU.

Optionally, after the terminal device determines the type of the MAC subPDU based on the result of parsing the MAC subheader, if the type of the MAC subPDU is a type of MAC subPDU including only a MAC subheader, the terminal device considers that the MAC subPDU has no corresponding RAR. If the type of the MAC subPDU is the type including only a MAC subheader, the terminal device does not need to receive the RAR corresponding to the MAC subheader.

Optionally, the MAC subPDU may include the first MAC subheader and the random access response RAR corresponding to the first MAC subheader.

Optionally, the first MAC subheader and the random access response RAR corresponding to the first MAC subheader are in a one-to-one or one-to-many correspondence.

Optionally, that the first MAC subheader and the random access response RAR corresponding to the first MAC subheader are in a one-to-many correspondence includes: The first MAC subheader includes RAPIDs of a plurality of corresponding random access responses RARs.

Specifically, after performing descrambling based on the RA-RNTI and obtaining the MAC PDU within an RA response window, the terminal device may parse the MAC subheader in the MAC PDU, and determine, based on the parsing result, the MAC subPDU corresponding to the terminal device.

Specifically, when the MAC PDU includes the first MAC subPDU, if the terminal device detects, in the MAC PDU, a RAPID that is the same as a RAPID of the terminal device, the terminal device may immediately obtain a MAC subPDU of the terminal device after the first MAC subheader. Therefore, this embodiment of this application helps the terminal device rapidly obtain a random access response for the terminal device.

When the MAC PDU includes the fourth MAC subPDU, if the terminal device detects, in the MAC PDU, a RAPID that is the same as a RAPID of the terminal device, the terminal device may obtain a MAC subPDU of the terminal device based on a group MAC subheader. Therefore, according to this embodiment of this application, a new MAC PDU format can be introduced into random access in a 5G system to transmit a random access response, and this helps the terminal device rapidly obtain a random access response for the terminal device.

In addition, when the MAC PDU includes the second MAC subPDU or the fifth MAC subPDU, if the terminal device detects, in the MAC PDU, the RAPID that is the same as the RAPID of the terminal device, the terminal device can obtain the acknowledgement for the on-demand system information SI request. Therefore, in this embodiment of this application, a new RAR format (to be specific, the RAR format may be null) can be added to the MAC PDU in response to the on-demand system information request of the terminal device, to be applicable to a scenario in which random access is used to request on-demand system information in the 5G system.

When the MAC PDU includes the third MAC subPDU, when no random access response is detected or no RAPID that is the same as a RAPID sent by the terminal device exists in a detected MAC PDU, the terminal device may determine, based on a backoff indicator in the third MAC subPDU, a time interval to initiate a next random access request.

Specifically, when the MAC subPDU may include a plurality of third MAC subPDUs, the terminal device may determine, based on a priority of a random access service, a backoff indicator corresponding to a priority of a service of the terminal device, and determine, based on the backoff indicator, a time interval to initiate a next random access request. In this way, a waiting time required for re-initiating random access for a high-priority service can be reduced.

The terminal device may determine, based on the first indication information in the MAC PDU, the format type of the RAR corresponding to the first MAC subheader.

Specifically, the terminal device determines the format types of the at least two RARs based on the bit. The first indication information is the bit, and the first indication information is used to explicitly indicate the format types of the RARs. Alternatively, the terminal device determines the format types of the at least two RARs based on the RAPIDs included in the first group MAC subheader. The first indication information is used to implicitly indicate that there is a correspondence between the RAPIDs and the format types in the group RAR.

Optionally, the terminal device may determine the format types of the at least two RARs in the group RAR based on the second indication information in the MAC PDU.

Specifically, the terminal device may determine the format types of the at least two RARs in the group RAR based on the bit. The second indication information is the bit, and the second indication information is used to explicitly indicate the format type of the RAR. Alternatively, the terminal device determines the format types of the at least two RARs in the group RAR based on the RAPIDs included in the first group MAC subheader. The second indication information is used to implicitly indicate that there is a correspondence between the RAPIDs and the format types in the group RAR.

Specifically, for the format type of the RAR, refer to the foregoing descriptions in step 310. To avoid repetition, details are not described herein again.

The following specifically describes how the terminal device determines the RA-RNTI.

In this embodiment of this application, a time-frequency location of a preamble determines an RA-RNTI value. An RA-RNTI may be calculated by using the following formula, and after sending the preamble, the terminal device monitors a PDCCH by using the RA-RNTI obtained through calculation:

$$RA\text{-}RNTI = 1 + t\_id + 10 * f\_id \quad (1)$$

where t_id is an index of a first subframe in a PRACH resource, and 0≤t_id<10; and f_id is an index, in ascending order in frequency domain, of a PRACH resource for sending an Msg1, and 0≤f_id<6.

In LTE, the RA-RNTI is calculated within one radio frame. Because there is only one type of resource usage attribute (for example, a numerology) in LTE, calculation of RA-RNTIs corresponding to different resource usage attributes (for example, a numerology) does not overlap. For example, in Formula (1), in one radio frame, a maximum quantity of subframe locations at which a PRACH resource is located is 10, and a quantity of PRACH frequency-domain location indexes is 6. In other words, one radio frame in LTE has a maximum of 60 PRACH time-frequency block locations. Therefore, the value obtained through RA-RNTI calculation can uniquely determine one PRACH time-frequency resource location.

Figure 20:
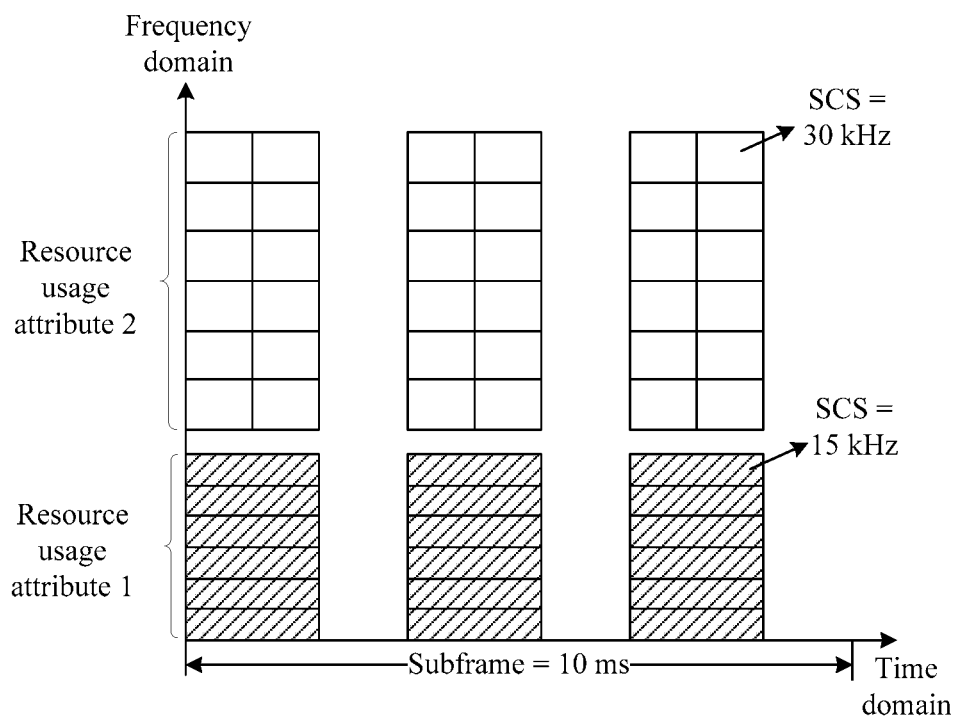
FIG. 20 is a schematic diagram of distribution (frequency-division) of random access resources corresponding to different resource usage attributes according to an embodiment of this application.
Figure 21:
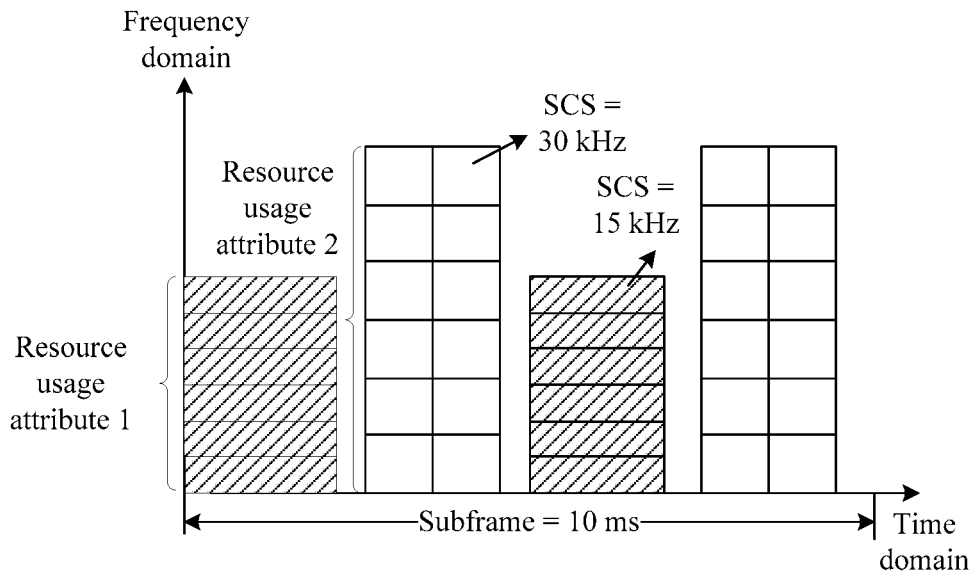
FIG. 21 is a schematic diagram of distribution (time-division) of random access resources corresponding to different resource usage attributes according to an embodiment of this application.

Optionally, physical random access resources PRACHs corresponding to different resource usage attributes in one radio frame in 5G may be time-division, or may be frequency-division. Distribution of the physical random access resources corresponding to a time-division case and a frequency-division case in the radio frame is shown below in FIG. 20 and FIG. 21. FIG. 20 is a schematic diagram of distribution (frequency-division) of random access resources corresponding to different resource usage attributes. FIG. 21 is a schematic diagram of distribution (time-division) of random access resources corresponding to different resource usage attributes. It may be understood that, FIG. 20 and FIG. 21 are merely examples. An actual quantity of resource usage attributes existing in the radio frame is not limited to 2, and distribution of time-frequency resource blocks corresponding to different resource usage attributes is not limited thereto. The access network device may configure physical random access resources corresponding to different resource usage attributes in a random access resource configuration, so that the terminal device can learn of time-frequency locations at which available physical random access resources exist.

Because different resource usage attributes are introduced into 5G different resource usage attributes correspond to different subcarrier spacings SCSs and transmission time interval TTI lengths. If a conventional LTE formula is used, RA-RNTI values obtained through calculation of PRACH resources corresponding to different resource usage attributes in one radio frame overlap, and the terminal device and the access network device cannot uniquely determine a location of a physical random access resource PRACH by using an RA-RNTI value like the conventional LTE. Therefore, an RA-RNTI calculation formula needs to be redesigned.

A possible implementation is as follows: Respective RA-RNTI calculation formulas are designed for different resource usage attributes by using the RA-RNTI calculation formula in LTE as a baseline, and the formula is specifically as follows:

$$RA\text{-}RNTI = 1 + t\_id^u + N_{frame}^{slot,u} * f\_id^u \quad (2)$$

where $N_{frame}^{slot,\mu}$ is a quantity of slots included in one frame in a physical resource attribute, $t\_id^u$ is a slot index number corresponding to a RACH resource transmitted in a physical resource attribute, $f\_id^u$ is a frequency-domain resource index number corresponding to a random access resource transmitted in a physical resource attribute, a value range of $t\_id^u$ is $0 \leq t\_id^u \leq N_{frame}^{slot,\mu}$, and a value range of $f\_id^u$ is $0 \leq f\_id^u < F_{max}^u$, where $F_{max}^u$ is a maximum quantity of random access frequency-domain resources corresponding to a RACH transmission occasion occasion in a physical resource attribute, and u is an index number of a physical resource attribute.

During calculation according to Formula (2), the following problem exists: When a resource usage attribute is 15 kHz, a quantity of slots included in one frame is 10; and when a resource usage attribute is 30 kHz, a quantity of slots included in one frame is 20. Therefore, when frequency domain identifiers f_id of both resource usage attributes are 0, RA-RNTI values of both resource usage attributes depend on t_id. Considering that t_id of both resource usage attributes starts from 0, values of RA-RNTIs corresponding to both resource usage attributes may be the same. As a result, when performing monitoring by using the RA-RNTIs, the terminal device cannot distinguish between detected RAR responses corresponding to the resource usage attributes.

Therefore, considering that the RA-RNTIs obtained through calculation of the different physical resource attributes may overlap, a solution may be as follows: A physical resource attribute is indicated by using a MAC subheader or a RAR, so that RA-RNTIs of different physical resource attributes are distinguished by using a physical resource usage attribute identifier in the MAC subheader or the RAR.

A method for indicating a physical resource attribute by using a MAC subheader or a RAR may further include an explicit manner or an implicit manner. The explicit manner is specifically: explicitly indicating the physical resource attribute in the MAC subheader by using a bit, or explicitly indicating the physical resource attribute in the RAR by using a bit.

Specifically, the implicit manner may be: implicitly indicating the physical resource attribute by using a component field (such as a RAPID) in the MAC subheader. Optionally, there is a correspondence between a RAPID and a physical resource attribute. For details about a method for implicitly indicating the physical resource attribute by using the RAR, refer to the foregoing description of implicitly carrying a physical resource attribute in a UL grant. Details are not described herein again.

Another possible implementation is as follows: One RA-RNTI calculation formula is used for all of the different physical resource attributes. The original RA-RNTI in LTE is equivalent to an identifier index indicating a random access physical time-frequency resource, so that the terminal device and the network device can learn of, by using a calculated RA-RNTI value, a specific physical time-frequency resource on which a preamble is sent.

Considering that the physical random access resources in 5G may correspond to a plurality of physical resource attributes, identifier indexes of random access physical time-frequency resources in one radio frame are sorted in a plurality of manners, for example, sequentially sorted based on the physical resource attributes (indexes of time-frequency resources corresponding to one physical resource attribute are consecutively sorted, and statistics collection of indexes of time-frequency resource blocks corresponding to another physical resource attribute different from the physical resource attribute is performed after sorting); or physical resource time-frequency block indexes are sorted based on a sequence in time domain.

(1) Physical resource time-frequency block indexes are sequentially sorted based on physical resource attributes.

Figure 22:
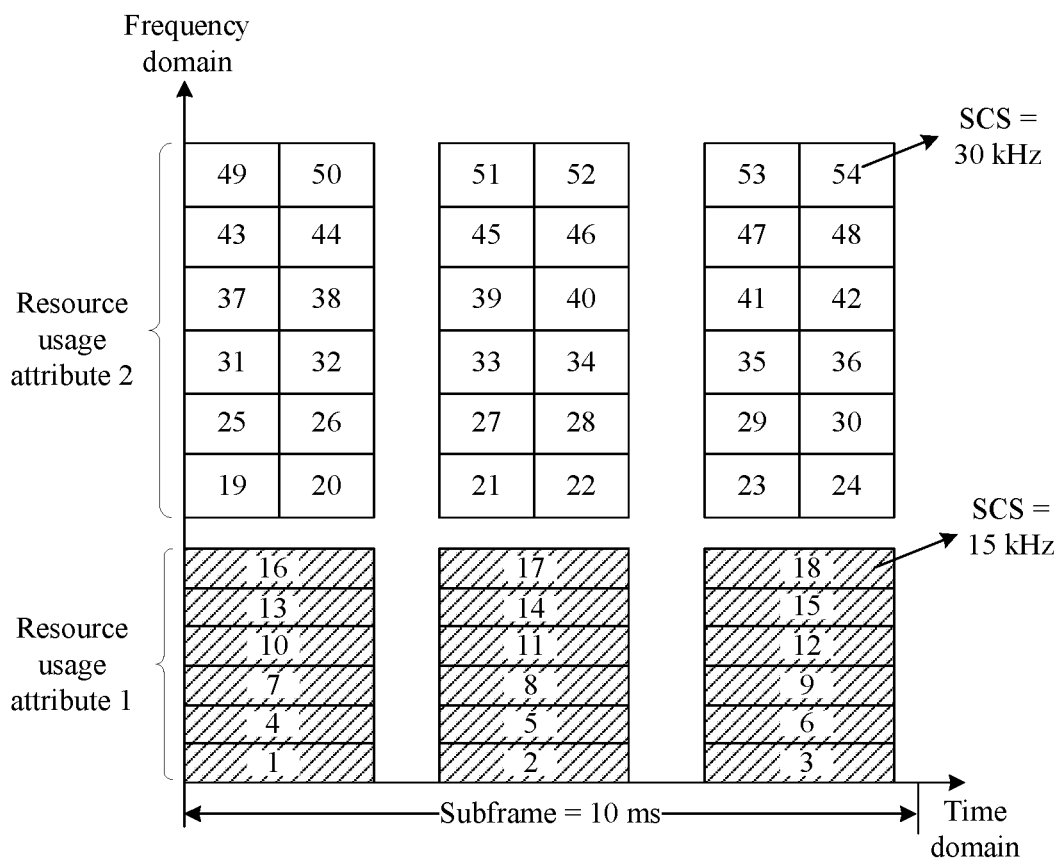
FIG. 22 is a schematic diagram of sequentially sorting physical resource time-frequency block indexes (frequency-division) based on physical resource attributes according to an embodiment of this application.
Figure 23:
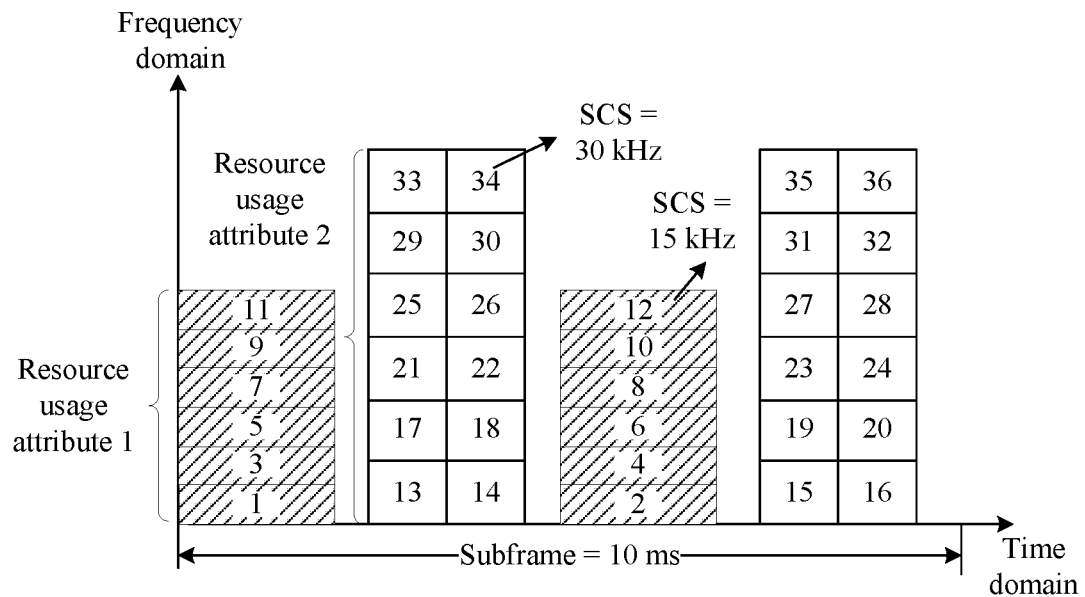
FIG. 23 is a schematic diagram of sequentially sorting physical resource time-frequency block indexes (time-division) based on physical resource attributes according to an embodiment of this application.

It may be understood that the following is merely an example. Specific physical resource time-frequency block index sorting is not limited thereto. Different index sorting manners correspond to different RA-RNTI formulas. FIG. 22 is a schematic diagram of sequentially sorting physical resource time-frequency block indexes (frequency-division) based on physical resource attributes. FIG. 23 is a schematic diagram of sequentially sorting physical resource time-frequency block indexes (time-division) based on physical resource attributes.

(2) Physical resource time-frequency block indexes are sequentially sorted based on a sequence in time domain.

Figure 24:
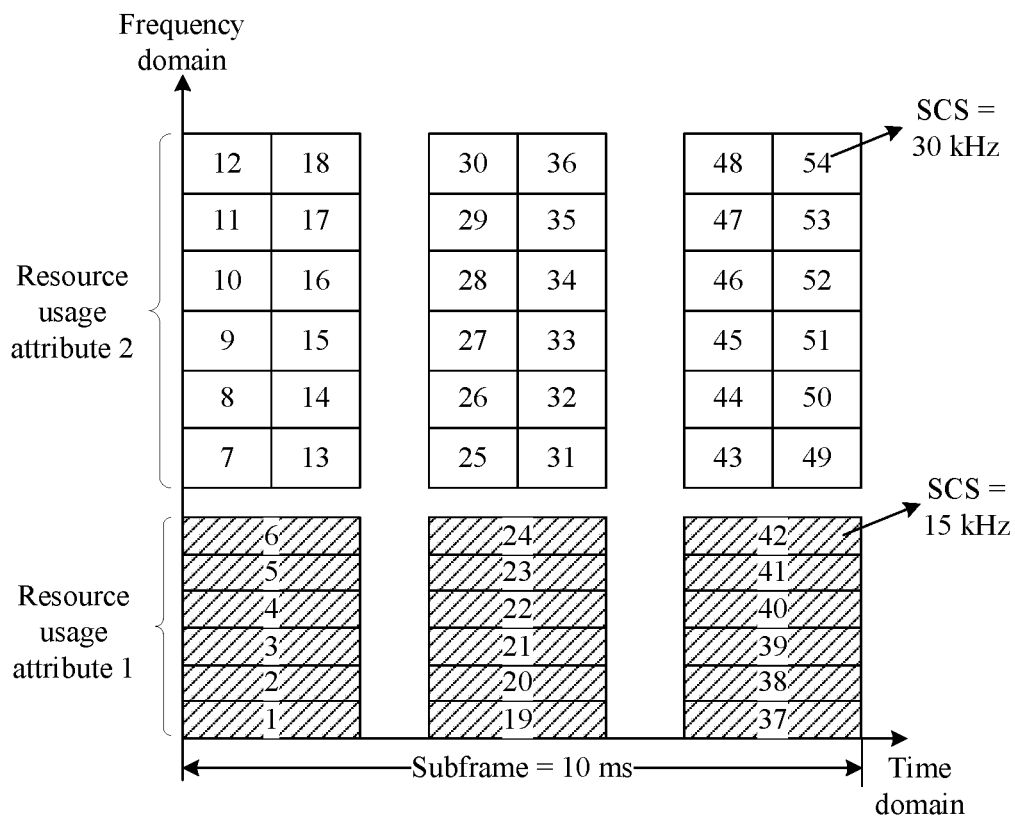
FIG. 24 is a schematic diagram of sequentially sorting physical resource time-frequency block indexes (frequency-division) based on a sequence in time domain according to an embodiment of this application.
Figure 25:
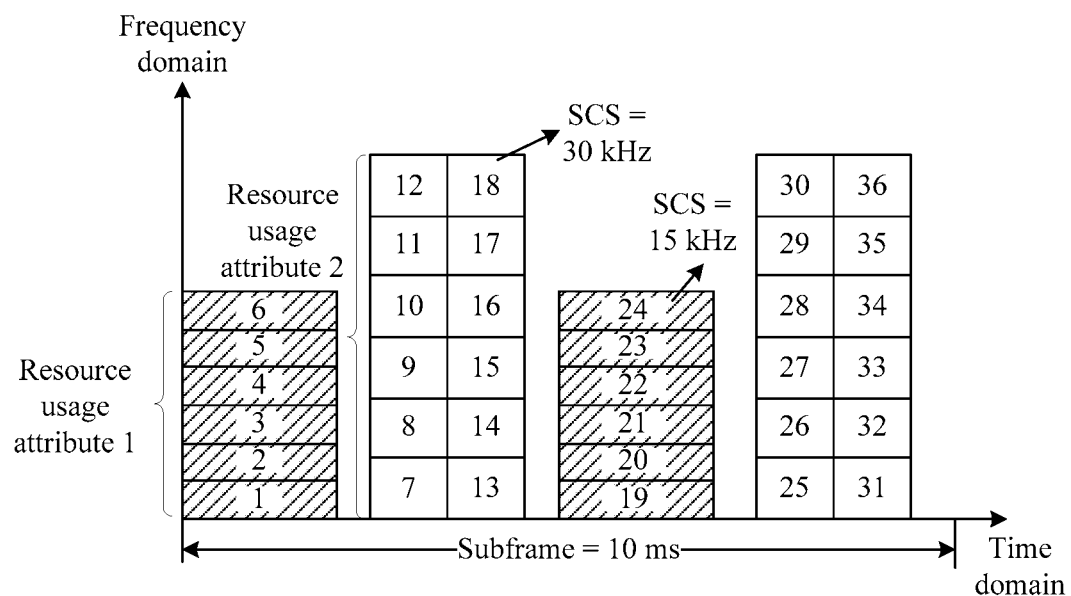
FIG. 25 is a schematic diagram of sequentially sorting physical resource time-frequency block indexes (time-division) based on a sequence in time domain according to an embodiment of this application.

It may be understood that the following is merely an example. Specific physical resource time-frequency block index sorting is not limited thereto. FIG. 24 is a schematic diagram of sequentially sorting physical resource time-frequency block indexes (frequency-division) based on a sequence in time domain. FIG. 25 is a schematic diagram of sequentially sorting physical resource time-frequency block indexes (time-division) based on a sequence in time domain.

Optionally, for the foregoing cases of sequentially sorting the physical resource time-frequency block indexes based on the physical resource attributes (FIG. 22 and FIG. 23), an RA-RNTI calculation formula is designed, and is specifically as follows:

(1) RAR window length extension is not considered. In this case, the RA-RNTI calculation formula does not reflect RAR window length impact. The specific RA-RNTI calculation formula may be expressed as:

$$RA\text{-}RNTI = \sum_{i=1}^{M_u} N_{frame}^{slot,i} * F_{max}^i + 1 + t\_id^u + N_{frame}^{slot,u} * f\_id^u \qquad (3)$$

where $N_{frame}^{slot,\mu}$ is a quantity of slots included in one frame in a physical resource attribute; u is an index number of the physical resource attribute; t_id is a slot index number corresponding to a RACH resource transmitted in a physical resource attribute; $F_{max}^u$ is a maximum quantity of random access frequency-domain resources corresponding to a RACH transmission occasion in a physical resource attribute; f_id is a frequency-domain resource index number corresponding to a random access resource transmitted in a physical resource attribute; $M_u$ is a quantity of physical resource attributes in one radio frame that satisfy a first condition, where the first condition is: a subcarrier spacing corresponding to the physical resource attribute is less than a subcarrier spacing corresponding to a current physical resource attribute; $M_u = L_{SCS}^u / L_{SCS}^{default}$, $M_u \leq 1$, where $L_{SCS}^{default}$ is a predefined subcarrier spacing value, for example, the value may be 15 kHz and may be fixed in a standard protocol or may be configured by the access network device; and $L_{SCS}^u$ s a value of a subcarrier spacing SCS in a physical resource attribute (an index number of the physical resource attribute is u).

A random access time-frequency resource block whose index corresponding to a resource usage attribute 1 is equal to 20 in FIG. 22 is used as an example. In this case, $N_{frame}^{slots,1}$ corresponding to the resource usage attribute 1 is equal to 3, and $F_{max}^1 = 6$; $N_{frame}^{slots,2}$ corresponding to a resource usage attribute 2 is equal to 6, and $F_{max}^2=6$; $M_u=L_{SCS}^2/L_{SCS}^{default}=15/15=1$; t_id$^2$ corresponding to the physical resource usage attribute 1 is equal to 1, and f_id=0. Therefore, an RA-RNTI obtained through calculation by using Formula (3) is:

$$RA\text{-}RNTI = \sum_{i=1}^{M_u} N_{frame}^{slot,i} * F_{max}^i + 1 + t\_id^u + N_{frame}^{slot,u} * f\_id^u = \qquad (4)$$

$$N_{frame}^{slots,1} * F_{max}^1 + 1 + t\_id^2 + N_{frame}^{slots,2} * f\_id^2 =$$

$$3*6 + 1 + 1 + 6*0 = 20$$

(2) RAR window length extension is considered. In this case, the RA-RNTI calculation formula reflects RAR window length impact, and RA-RNTI values in different radio frames within RAR window length duration need to be distinguished.

The specific RA-RNTI calculation formula may be expressed as:

$$RA\text{-}RNTI = \sum_{i=1}^{M_u} N_{frame}^{slot,i} * F_{max}^i + 1 + t\_id^u + N_{frame}^{slot,u} * f\_id^u + \qquad (5)$$

$$\sum_{i=1}^{M_{max}} N_{frame}^{slot,i} * F_{max}^i * (SFN\_id \bmod(W_{max}/N_{max}^{slot}))$$

where SFN_id is a frame index number, and $W_{max}$ is a maximum RAR window length, where it may be understood that a unit of a RAR window may be a quantity of slots; and $N_{max}^{slot}$ is a maximum value of a quantity of slots corresponding to all physical resource attributes in a radio frame, where if a quantity of slots included in one frame is 10 in a physical resource attribute of 15 kHz, and a quantity of slots included in one frame is 20 in a physical resource attribute of 30 kHz, a value of $N_{max}^{slot}$ is 20.

It may be understood that RAR window lengths corresponding to different resource attributes may be different, or may be the same. When the RAR window lengths are different, a value of $W_{max}$ is a maximum value. When the RAR window lengths are the same, all values are the same.

In addition, another possible implementation is as follows: A conventional RA-RNTI calculation formula is not used, and the access network device delivers a correspondence between random access time-frequency resource locations corresponding to different resource usage attributes and indexes of the resource usage attributes to the terminal device. A specific form is not limited, and may be a table of the correspondence between the time-frequency resource locations and the indexes of the resource usage attributes.

In this manner, the correspondence may be configured for the terminal device by using system information or an RRC message. An advantage is simplicity, and the RA-RNTI calculation is omitted. However, a disadvantage is that the time-frequency resource locations and corresponding information of the indexes need to be configured for the terminal device, causing high signaling overheads.

Figure 26:
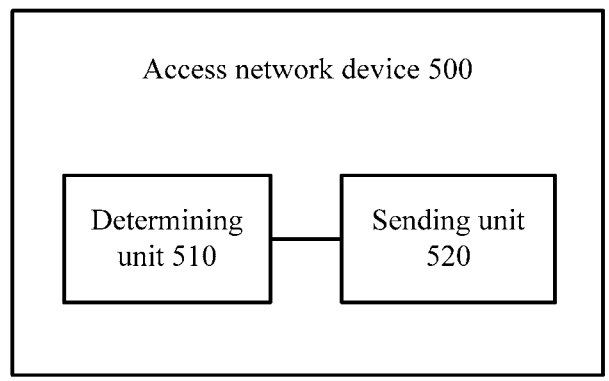
FIG. 26 is a schematic block diagram of an access network device according to an embodiment of this application.

FIG. 26 is a schematic block diagram of an access network device 500 according to an embodiment of this application. The access network device 500 includes a determining unit 510 and a sending unit 520.

The determining unit 510 is configured to determine a Medium Access Control (MAC) protocol data unit (PDU),
where the MAC PDU includes at least two MAC subPDUs, the at least two MAC subPDUs include at least a first MAC subPDU, the first MAC subPDU includes a first MAC subheader and a random access response RAR corresponding to the first MAC subheader, and the first MAC subheader is located before the RAR corresponding to the first MAC subheader.

The sending unit 520 is configured to send the MAC PDU.

When the MAC PDU includes at least two first MAC subPDUs, a first MAC subheader and a RAR are placed in an interleaved manner. To be specific, each first MAC subPDU includes a first MAC subheader and a RAR corresponding to the first MAC subheader, and the first MAC subheader is located before and adjacent to the RAR corresponding to the first MAC subheader. In this way, the MAC subheader and the RAR are placed in the interleaved manner, so that the MAC subheader can be immediately placed before the corresponding RAR, thereby changing a conventional MAC PDU format in random access in LTE.

In addition, an existing 5G standard has specified that an interleaved manner in which a MAC subheader and a payload are placed exists in a MAC PDU that is based on data and a MAC CE. Therefore, according to this embodiment of this application, a format of a MAC PDU in random access in a 5G NR system can be uniform with a format of the MAC PDU that is based on data and a MAC CE in the existing 5G standard.

Optionally, the first MAC subheader further includes first indication information, the first indication information is used to indicate a format type of the RAR corresponding to the first MAC subheader, and the format type of the RAR corresponds to a random access event.

Optionally, the first indication information has a bit for indicating the format type of the RAR explicitly; or the first MAC subheader further includes a first RAPID, and the first indication information is used to implicitly indicate that there is a correspondence between the first RAPID and the format type of the RAR.

Optionally, the at least two MAC subPDUs further include a second MAC subPDU, the second MAC subPDU includes only a second MAC subheader, the second MAC subheader includes a second RAPID, and there is a correspondence between the second RAPID and one or more on-demand system information requests.

Therefore, in this embodiment of this application, a new RAR format (to be specific, the RAR format may be null) can be added to the MAC PDU in response to an on-demand system information request of a terminal device, to be applicable to a scenario in which random access is used to request on-demand system information in a 5G system.

Optionally, the at least two MAC subPDUs further include a third MAC subPDU, the third MAC subPDU includes only a third MAC subheader, the third MAC subheader includes backoff indicator information, and the backoff indicator information is used to instruct the terminal device to determine, when no random access response is detected or no RAPID that is the same as a RAPID sent by the terminal device exists in a detected MAC PDU, a time interval to initiate a next random access request.

Optionally, the third MAC subPDU is located before the first MAC subPDU and the second MAC subPDU, and the first MAC subPDU is located before the second MAC subPDU, or the first MAC subPDU is located after the second MAC subPDU.

Optionally, the MAC PDU further includes padding which is located at the end of the MAC PDU, and whether the MAC PDU includes the padding and a length of the padding are determined based on a size of a transport block (TB), a number of all MAC subheaders and RARs.

Figure 27:
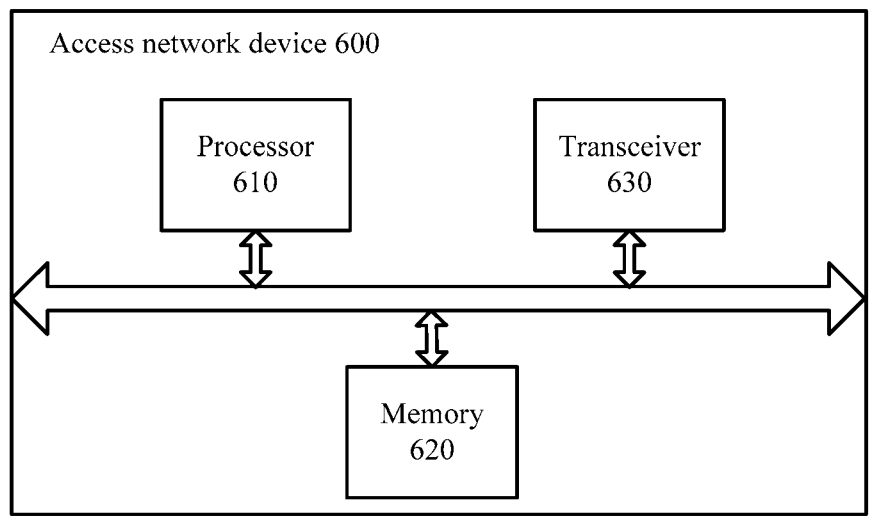
FIG. 27 is a schematic block diagram of another access network device according to an embodiment of this application.

It should be noted that, in this embodiment of the present invention, the determining unit 510 may be implemented by a processor, and the sending unit 520 may be implemented by a transceiver. As shown in FIG. 27, an access network device 600 may include a processor 610, a memory 620, and a transceiver 630. The memory 620 may be configured to store code or the like executed by the processor 610, and the processor 610 may be configured to process data or a program.

During implementation, the steps of the foregoing methods may be completed by an integrated logic circuit of hardware in the processor 610 or by an instruction in a software form. The steps of the method disclosed with reference to the embodiments of the present invention may be directly performed by a hardware processor, or may be performed by using a combination of hardware in the processor and a software module. The software module may be located in a mature storage medium in the art such as a random access memory, a flash memory, a read-only memory, a programmable read-only memory, an electrically erasable programmable memory, or a register. The storage medium is located in the memory 620, and the processor 610 reads information in the memory 620, to complete the steps of the method in combination with hardware of the processor 610. To avoid repetition, details are not described herein again.

The access network device 500 shown in FIG. 26 or the access network device 600 shown in FIG. 27 can implement the processes corresponding to the foregoing method embodiment shown in FIG. 3. Specifically, for implementation of the access network device 500 or the access network device 600, refer to the descriptions in FIG. 3. To avoid repetition, details are not described herein again.

Figure 28:
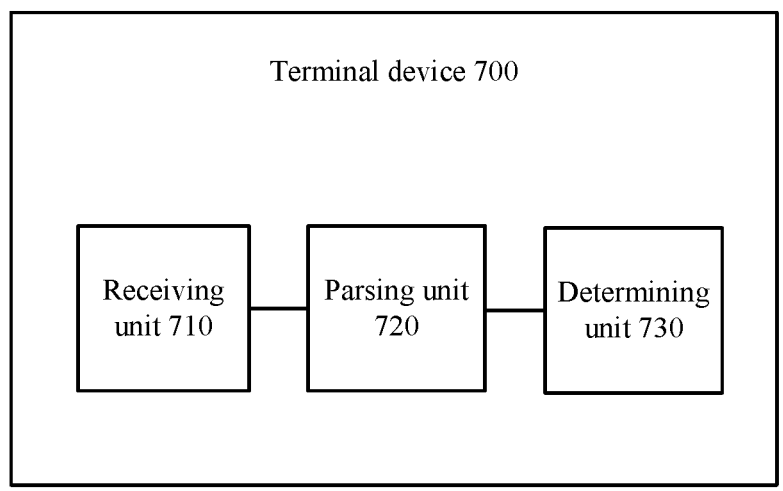
FIG. 28 is a schematic block diagram of a terminal device according to an embodiment of this application.

FIG. 28 is a schematic block diagram of a terminal device 700 according to an embodiment of this application. The terminal device 700 includes a receiving unit 710, a parsing unit 720, and a determining unit 730.

The receiving unit 710 is configured to receive a Medium Access Control (MAC) protocol data unit (PDU) sent by an access network device, where the MAC PDU includes at least two MAC subPDUs, the at least two MAC subPDUs include at least a first MAC subPDU, the first MAC subPDU includes a first MAC subheader and a random access response RAR corresponding to the first MAC subheader, and the first MAC subheader is located before the RAR corresponding to the first MAC subheader.

The parsing unit 720 is configured to parse a MAC subheader included in each MAC subPDU.

The determining unit 730 is configured to determine, based on a result of parsing the MAC subheader, a MAC subPDU corresponding to the terminal device.

In this embodiment of this application, when the MAC PDU includes the first MAC subPDU, if the terminal device detects, in the MAC PDU, a RAPID that is the same as a RAPID of the terminal device, the terminal device may immediately obtain a MAC subPDU of the terminal device after the first MAC subheader. Therefore, this embodiment of this application helps the terminal device rapidly obtain a random access response for the terminal device.

Optionally, the first MAC subheader further includes first indication information, the first indication information is used to indicate a format type of the RAR corresponding to the first MAC subheader, and the format type of the RAR corresponds to a random access event.

Optionally, the first indication information has a bit for indicating the format type of the RAR explicitly; or the first MAC subheader further includes a first RAPID, and the first indication information is used to implicitly indicate that there is a correspondence between the first RAPID and the format type of the RAR.

Specifically, the access network device and the terminal device each may preconfigure a correspondence between a RAPID and a format type of a RAR. In this way, when determining a RAP that needs to be sent to the access network device, the terminal device may determine, based on the preconfigured correspondence between a RAPID and a RAR, a format type of a RAR corresponding to the terminal device. Further, the terminal device may parse at least one MAC subheader in a MAC PDU based on a RAPID, to obtain a random access response for the terminal device.

Optionally, the at least two MAC subPDUs further include a second MAC subPDU, the second MAC subPDU includes only a second MAC subheader, the second MAC subheader includes a second RAPID, and there is a correspondence between the second RAPID and one or more on-demand system information requests.

Therefore, in this embodiment of this application, a new RAR format (to be specific, the RAR format may be null) can be added to the MAC PDU in response to the on-demand system information request of the terminal device, to be applicable to a scenario in which random access is used to request on-demand system information in a 5G system.

Optionally, the at least two MAC subPDUs further include a third MAC subPDU, the third MAC subPDU includes only a third MAC subheader, the third MAC subheader includes backoff indicator information, and the backoff indicator information is used to instruct the terminal device to determine, when no random access response is detected or no RAPID that is the same as a RAPID sent by the terminal device exists in a detected MAC PDU, a time interval to initiate a next random access request.

Optionally, the third MAC subPDU is located before the first MAC subPDU and the second MAC subPDU, and the first MAC subPDU is located before the second MAC subPDU, or the first MAC subPDU is located after the second MAC subPDU.

Optionally, the MAC PDU further includes padding, the padding is located at the end of the MAC PDU, and whether the MAC PDU includes the padding and a length of the padding are determined based on a size of a transport block (TB) and a number of all MAC subheaders and RARs.

Figure 29:
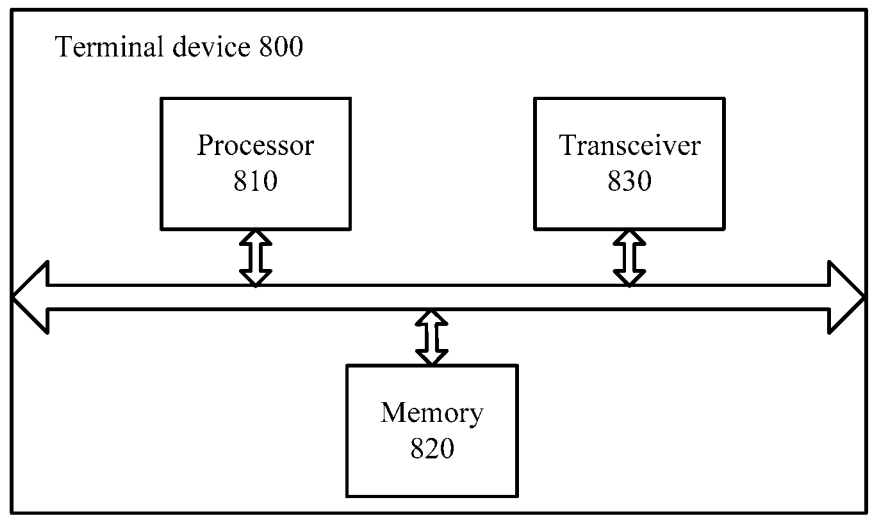
FIG. 29 is a schematic block diagram of another terminal device according to an embodiment of this application.

It should be noted that, in this embodiment of the present invention, the receiving unit 710 may be implemented by a transceiver, and the parsing unit 720 and the determining unit 730 may be implemented by a processor. As shown in FIG. 29, a terminal device 800 may include a processor 810, a memory 820, and a transceiver 830. The memory 820 may be configured to store code or the like executed by the processor 810, and the processor 810 may be configured to process data or a program.

During implementation, the steps of the foregoing methods may be completed by an integrated logic circuit of hardware in the processor 810 or by an instruction in a software form. The steps of the method disclosed with reference to the embodiments of the present invention may be directly performed by a hardware processor, or may be performed by using a combination of hardware in the processor and a software module. The software module may be located in a mature storage medium in the art such as a random access memory, a flash memory, a read-only memory, a programmable read-only memory, an electrically erasable programmable memory, or a register. The storage medium is located in the memory 820, and the processor 810 reads information in the memory 820, to complete the steps of the method in combination with hardware of the processor 810. To avoid repetition, details are not described herein again.

The terminal device 700 shown in FIG. 28 or the terminal device 800 shown in FIG. 29 can implement the processes corresponding to the foregoing method embodiment shown in FIG. 3. Specifically, for implementation of the terminal device 700 or the terminal device 800, refer to the descriptions in FIG. 3. To avoid repetition, details are not described herein again.

Figure 30:
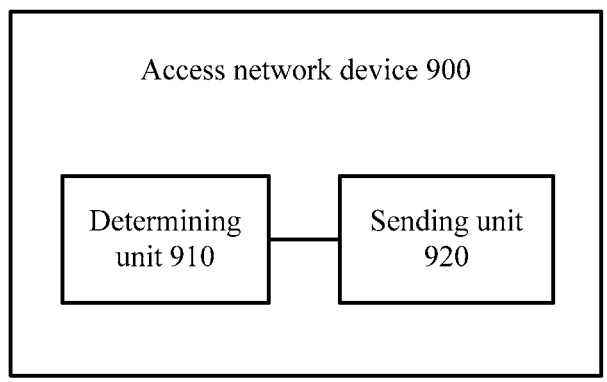
FIG. 30 is a schematic block diagram of an access network device according to an embodiment of this application.

FIG. 30 is a schematic block diagram of an access network device 900 according to an embodiment of this application. The access network device 900 includes a determining unit 910 and a sending unit 920.

The determining unit 910 is configured to determine a Medium Access Control (MAC) protocol data unit (PDU), where the MAC PDU includes at least two MAC subPDUs, the at least two MAC subPDUs include at least a fourth MAC subPDU, the fourth MAC subPDU includes a first group MAC subheader and a group random access response RAR corresponding to the first group MAC subheader, the first group MAC subheader includes at least two first random access preamble identifiers RAPIDs, and the group RAR includes at least two RARs in a one-to-one correspondence with the at least two first RAPIDs.

The sending unit 920 is configured to send the MAC PDU.

When the MAC PDU includes at least two first MAC subPDUs, a first MAC subheader and a RAR are placed in an interleaved manner. To be specific, each first MAC subPDU includes a first MAC subheader and a RAR corresponding to the first MAC subheader, and the first MAC subheader is located before and adjacent to the RAR corresponding to the first MAC subheader. In this way, the MAC subheader and the RAR are placed in the interleaved manner, so that the MAC subheader can be immediately placed before the corresponding RAR, thereby changing a conventional MAC PDU format in random access in LTE.

In addition, an existing 5G standard has specified that an interleaved manner in which a MAC subheader and a payload are placed exists in a MAC PDU that is based on data and a MAC CE. Therefore, according to this embodiment of this application, a format of a MAC PDU in random access in a 5G NR system can be uniform with a format of the MAC PDU that is based on data and a MAC CE in the existing 5G standard.

Optionally, the first group MAC subheader further includes second indication information, the second indication information is used to indicate format types of the at least two RARs in the group RAR corresponding to the first group MAC subheader, the format types of the at least two RARs in the group RAR are the same, and the format type of the RAR corresponds to a random access event.

Optionally, the second indication information has a bit for indicating the format type of the RAR explicitly; or the second indication information is used to implicitly indicate that there is a correspondence between the first RAPID and the format type of the RAR.

Optionally, the at least two MAC subPDUs further include a fifth MAC subPDU, the fifth MAC subPDU includes only a second group MAC subheader, the second group MAC subheader includes at least one second RAPID, and there is a correspondence between the second RAPID and one or more on-demand system information requests.

Therefore, in this embodiment of this application, a new RAR format (to be specific, the RAR format may be null) can be added to the MAC PDU in response to an on-demand system information request of a terminal device, to be applicable to a scenario in which random access is used to request on-demand system information in a 5G system.

Optionally, the at least two MAC subPDUs further include a third MAC subPDU, the third MAC subPDU includes only a third MAC subheader, the third MAC subheader includes backoff indicator information, and the backoff indicator information is used to instruct the terminal device to determine, when no random access response is detected or no RAPID that is the same as a RAPID sent by the terminal device exists in a detected MAC PDU, a time interval to initiate a next random access request.

Figure 31:
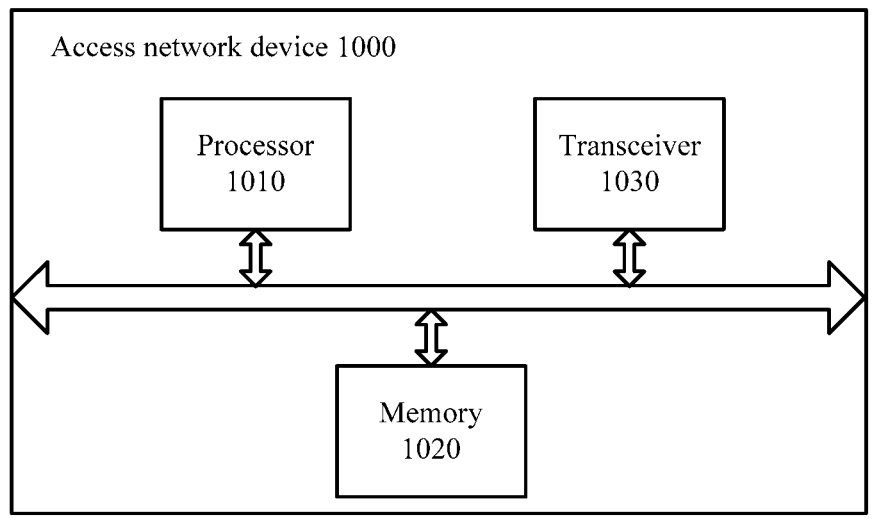
FIG. 31 is a schematic block diagram of another access network device according to an embodiment of this application.

It should be noted that, in this embodiment of the present invention, the determining unit 910 may be implemented by a processor, and the sending unit 920 may be implemented by a transceiver. As shown in FIG. 31, an access network device 1000 may include a processor 1010, a memory 1020, and a transceiver 1030. The memory 1020 may be configured to store code or the like executed by the processor 1010, and the processor 1010 may be configured to process data or a program.

During implementation, the steps of the foregoing methods may be completed by an integrated logic circuit of hardware in the processor 1010 or by an instruction in a software form. The steps of the method disclosed with reference to the embodiments of the present invention may be directly performed by a hardware processor, or may be performed by using a combination of hardware in the processor and a software module. The software module may be located in a mature storage medium in the art such as a random access memory, a flash memory, a read-only memory, a programmable read-only memory, an electrically erasable programmable memory, or a register. The storage medium is located in the memory 1020, and the processor 1010 reads information in the memory 1020, to complete the steps of the method in combination with hardware of the processor 1010. To avoid repetition, details are not described herein again.

The access network device 900 shown in FIG. 30 or the access network device 1000 shown in FIG. 31 can implement the processes corresponding to the foregoing method embodiment shown in FIG. 3. Specifically, for implementation of the access network device 900 or the access network device 1000, refer to the descriptions in FIG. 3. To avoid repetition, details are not described herein again.

Figure 32:
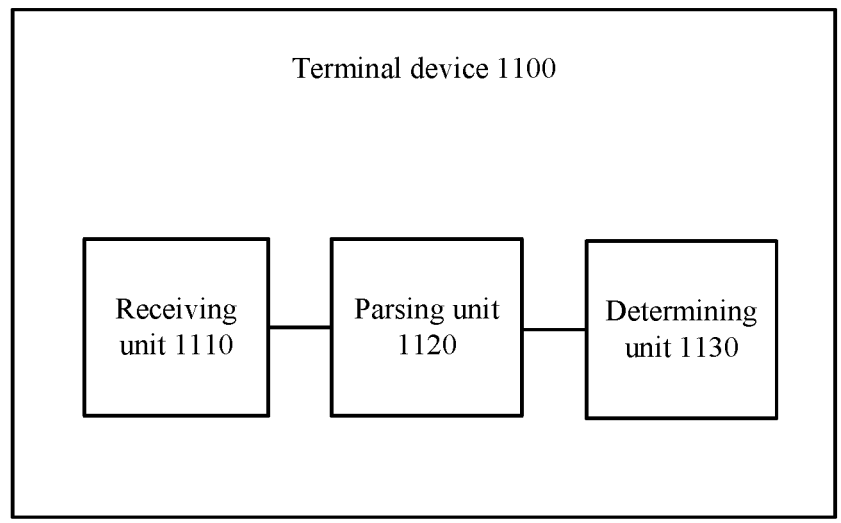
FIG. 32 is a schematic block diagram of a terminal device according to an embodiment of this application.

FIG. 32 is a schematic block diagram of a terminal device 1100 according to an embodiment of this application. The terminal device 1100 includes a receiving unit 1110, a parsing unit 1120, and a determining unit 1130.

The receiving unit 1110 is configured to receive a Medium Access Control (MAC) protocol data unit (PDU) sent by an access network device, where the MAC PDU includes at least two MAC subPDUs, the at least two MAC subPDUs include at least a fourth MAC subPDU, the fourth MAC subPDU includes a first group MAC subheader and a group random access response RAR corresponding to the first group MAC subheader, the first group MAC subheader includes at least two first random access preamble identifiers RAPIDs, and the group RAR includes at least two RARs in a one-to-one correspondence with the at least two first RAPIDs.

The parsing unit 1120 is configured to parse a MAC subheader included in each MAC subPDU.

The determining unit 1130 is configured to determine, based on a result of parsing the MAC subheader, a MAC subPDU corresponding to the terminal device.

When the MAC PDU includes the fourth MAC subPDU, if the terminal device detects, in the MAC PDU, a RAPID that is the same as a RAPID of the terminal device, the terminal device may obtain a MAC subPDU of the terminal device based on a group MAC subheader. Therefore, according to this embodiment of this application, a new MAC PDU format can be introduced into random access in a 5G system to transmit a random access response, and this helps the terminal device rapidly obtain a random access response for the terminal device.

Optionally, the first group MAC subheader further includes second indication information, the second indication information is used to indicate format types of the at least two RARs in the group RAR corresponding to the first group MAC subheader, the format types of the at least two RARs in the group RAR are the same, and the format type of the RAR corresponds to a random access event.

Optionally, the second indication information has a bit for indicating the format type of the RAR explicitly; or the second indication information is used to implicitly indicate that there is a correspondence between the first RAPID and the format type of the RAR.

Optionally, the at least two MAC subPDUs further include a fifth MAC subPDU, the fifth MAC subPDU includes only a second MAC subheader, the second MAC subheader includes a second RAPID, and there is a correspondence between the second RAPID and one or more on-demand system information requests.

Therefore, in this embodiment of this application, a new RAR format (to be specific, the RAR format may be null) can be added to the MAC PDU in response to an on-demand system information request of the terminal device, to be applicable to a scenario in which random access is used to request on-demand system information in a 5G system.

In addition, MAC subPDUs that are sent in a group-based manner are introduced into this embodiment of this application. In this case, MAC subheaders in which RARs of a same type are returned may be packetized together and then sent. In other words, format types of the at least two RARs in the fourth MAC subPDU are the same, and all RARs in the fifth MAC subPDU are null.

Optionally, the at least two MAC subPDUs further include a third MAC subPDU, the third MAC subPDU includes only a third MAC subheader, the third MAC subheader includes backoff indicator information, and the backoff indicator information is used to instruct the terminal device to determine, when no random access response is detected or no RAPID that is the same as a RAPID sent by the terminal device exists in a detected MAC PDU, a time interval to initiate a next random access request.

Figure 33:
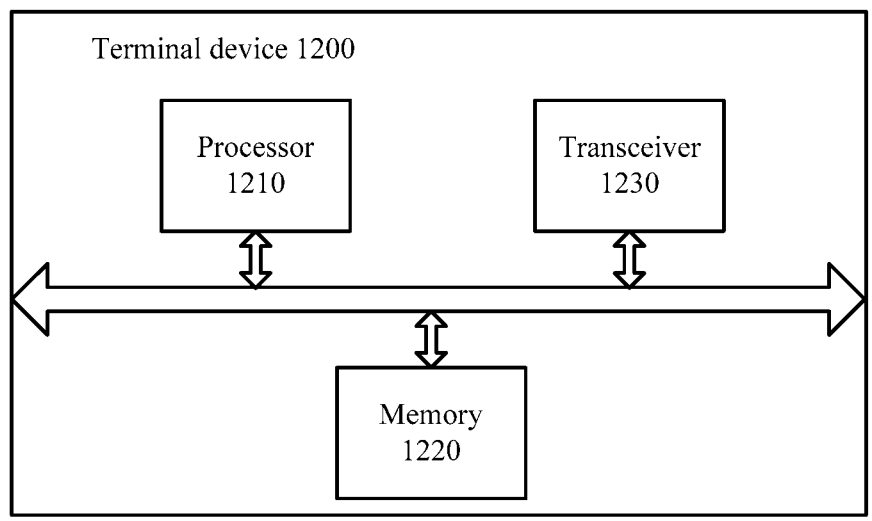
FIG. 33 is a schematic block diagram of another terminal device according to an embodiment of this application.

It should be noted that, in this embodiment of the present invention, the receiving unit 1110 may be implemented by a transceiver, and the parsing unit 1120 and the determining unit 1130 may be implemented by a processor. As shown in FIG. 33, a terminal device 1200 may include a processor 1210, a memory 1220, and a transceiver 1230. The memory 1220 may be configured to store code or the like executed by the processor 1210, and the processor 1210 may be configured to process data or a program.

During implementation, the steps of the foregoing methods may be completed by an integrated logic circuit of hardware in the processor 1210 or by an instruction in a software form. The steps of the method disclosed with reference to the embodiments of the present invention may be directly performed by a hardware processor, or may be performed by using a combination of hardware in the processor and a software module. The software module may be located in a mature storage medium in the art such as a random access memory, a flash memory, a read-only memory, a programmable read-only memory, an electrically erasable programmable memory, or a register. The storage medium is located in the memory 1220, and the processor 1210 reads information in the memory 1220, to complete the steps of the method in combination with hardware of the processor 1210. To avoid repetition, details are not described herein again.

The terminal device 1100 shown in FIG. 32 or the terminal device 1200 shown in FIG. 33 can implement the processes corresponding to the foregoing method embodiment shown in FIG. 3. Specifically, for implementation of the terminal device 1100 or the terminal device 1200, refer to the descriptions in FIG. 3. To avoid repetition, details are not described herein again.

Figure 34:
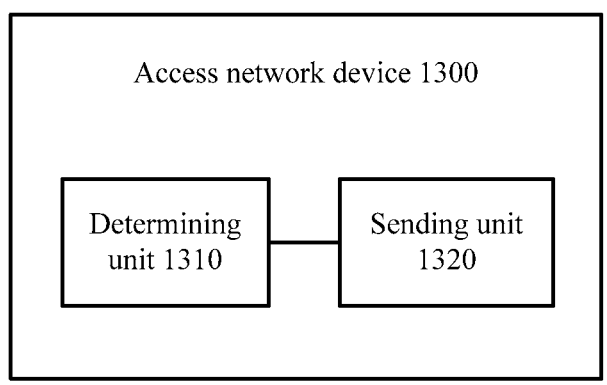
FIG. 34 is a schematic block diagram of an access network device according to an embodiment of this application.

FIG. 34 is a schematic block diagram of an access network device 1300 according to an embodiment of this application. The access network device 1300 includes a determining unit 1310 and a sending unit 1320.

The determining unit 1310 is configured to determine a Medium Access Control (MAC) protocol data unit (PDU), where the MAC PDU includes at least one MAC subPDU, the MAC subPDU includes a MAC subheader, and the MAC subheader includes at least one RAPID.

The sending unit 1320 is configured to send the MAC PDU.

Optionally, the MAC subPDU includes only the MAC subheader, and there is a correspondence between the RAPID and one or more on-demand system information requests.

Therefore, in this embodiment of this application, a new RAR format (to be specific, the RAR format may be null) can be added to the MAC PDU in response to an on-demand system information request of a terminal device, to be applicable to a scenario in which random access is used to request on-demand system information in a 5G system.

Optionally, when there is one MAC subPDU, and the MAC subheader includes at least two RAPIDs, the MAC subPDU further includes at least two RARs in a one-to-one correspondence with the at least two RAPIDs, where format types of the at least two RARs are the same, and there is a correspondence between the format type of the RAR and an RA-RNTI.

In addition, the correspondence may be pre-stored in the access network device and the terminal device. When a specific RNTI can be used by the terminal device to monitor a PDCCH, the terminal device may determine a format type of a MAC subPDU in a PDSCH corresponding to the PDCCH. Further, the terminal device may obtain a random access response for the terminal device from the MAC PDU based on the format type of the MAC subPDU.

Figure 35:
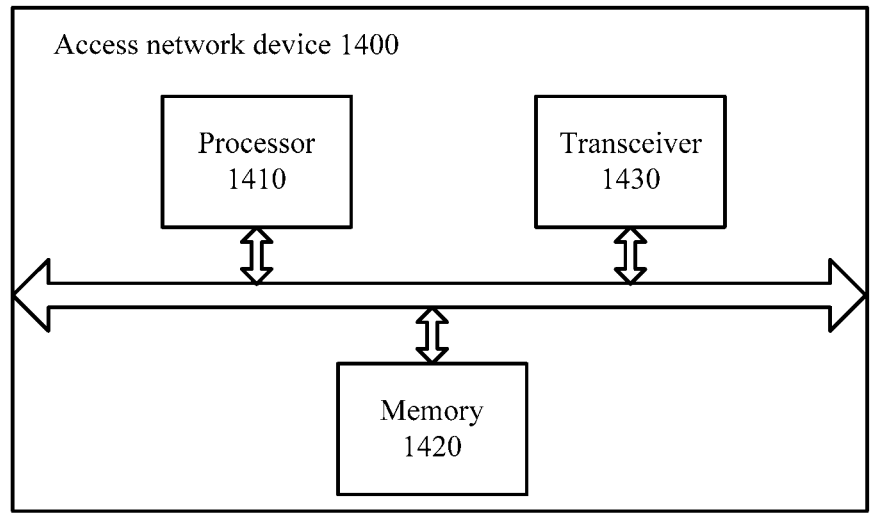
FIG. 35 is a schematic block diagram of another access network device according to an embodiment of this application.

It should be noted that, in this embodiment of the present invention, the determining unit 1310 may be implemented by a processor, and the sending unit 1320 may be implemented by a transceiver. As shown in FIG. 35, an access network device 1400 may include a processor 1410, a memory 1420, and a transceiver 1430. The memory 1420 may be configured to store code or the like executed by the processor 1410, and the processor 1410 may be configured to process data or a program.

During implementation, the steps of the foregoing methods may be completed by an integrated logic circuit of hardware in the processor 1410 or by an instruction in a software form. The steps of the method disclosed with reference to the embodiments of the present invention may be directly performed by a hardware processor, or may be performed by using a combination of hardware in the processor and a software module. The software module may be located in a mature storage medium in the art such as a random access memory, a flash memory, a read-only memory, a programmable read-only memory, an electrically erasable programmable memory, or a register. The storage medium is located in the memory 1420, and the processor 1410 reads information in the memory 1420, to complete the steps of the method in combination with hardware of the processor 1410. To avoid repetition, details are not described herein again.

The access network device 1300 shown in FIG. 34 or the access network device 1400 shown in FIG. 35 can implement the processes corresponding to the foregoing method embodiment shown in FIG. 3. Specifically, for implementation of the access network device 1300 or the access network device 1400, refer to the descriptions in FIG. 3. To avoid repetition, details are not described herein again.

Figure 36:
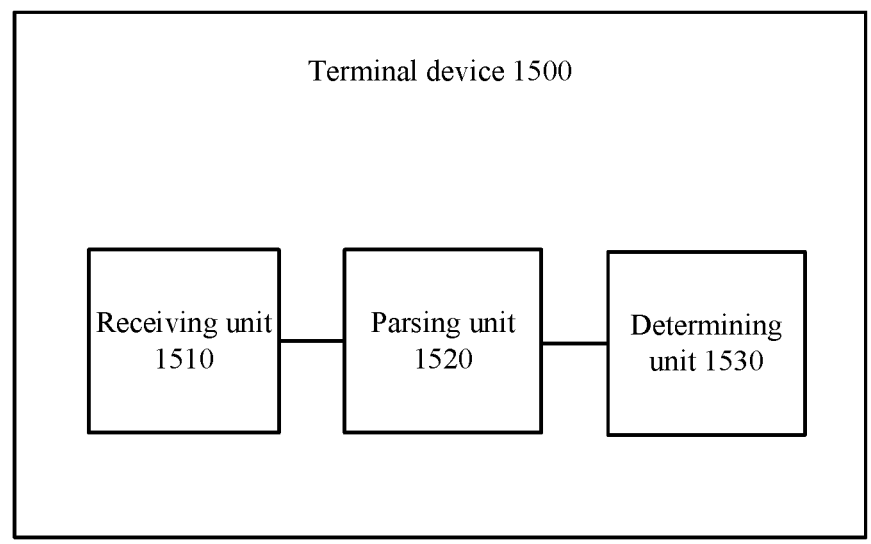
FIG. 36 is a schematic block diagram of a terminal device according to an embodiment of this application.

FIG. 36 is a schematic block diagram of a terminal device 1500 according to an embodiment of this application. The terminal device 1500 includes a receiving unit 1510, a parsing unit 1520, and a determining unit 1530.

The receiving unit 1510 is configured to receive a Medium Access Control (MAC) protocol data unit (PDU) sent by an access network device, where the MAC PDU includes at least one MAC subPDU, the MAC subPDU includes a MAC subheader, and the MAC subheader includes at least one RAPID.

The parsing unit 1520 is configured to parse a MAC subheader included in each MAC subPDU.

The determining unit 1530 is configured to determine, based on a result of parsing the MAC subheader, a MAC subPDU corresponding to the terminal device.

Optionally, there is a correspondence between the RAPID and one or more on-demand system information requests.

Therefore, in this embodiment of this application, a new RAR format (to be specific, the RAR format may be null) can be added to the MAC PDU in response to the on-demand system information request of the terminal device, to be applicable to a scenario in which random access is used to request on-demand system information in a 5G system.

Optionally, when there is one MAC subPDU, and the MAC subheader includes at least two RAPIDs, the MAC subPDU further includes at least two RARs in a one-to-one correspondence with the at least two RAPIDs, where format types of the at least two RARs are the same, and there is a correspondence between the format type of the RAR and an RA-RNTI.

In addition, the correspondence may be pre-stored in the access network device and the terminal device. When a specific RNTI can be used by the terminal device to monitor a PDCCH, the terminal device may determine a format type of a MAC subPDU in a PDSCH corresponding to the PDCCH. Further, the terminal device may obtain a random access response for the terminal device from the MAC PDU based on the format type of the MAC subPDU.

Figure 37:
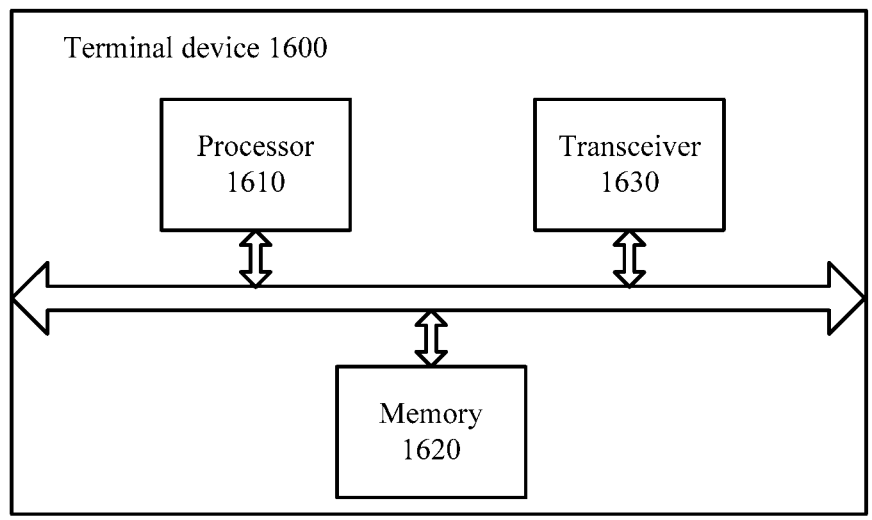
FIG. 37 is a schematic block diagram of another terminal device according to an embodiment of this application.

It should be noted that, in this embodiment of the present invention, the receiving unit 1510 may be implemented by a transceiver, and the parsing unit 1520 and the determining unit 1530 may be implemented by a processor. As shown in FIG. 37, a terminal device 1600 may include a processor 1610, a memory 1620, and a transceiver 1630. The memory 1620 may be configured to store code or the like executed by the processor 1610, and the processor 1610 may be configured to process data or a program.

During implementation, the steps of the foregoing methods may be completed by an integrated logic circuit of hardware in the processor 1610 or by an instruction in a software form. The steps of the method disclosed with reference to the embodiments of the present invention may be directly performed by a hardware processor, or may be performed by using a combination of hardware in the processor and a software module. The software module may be located in a mature storage medium in the art such as a random access memory, a flash memory, a read-only memory, a programmable read-only memory, an electrically erasable programmable memory, or a register. The storage medium is located in the memory 1620, and the processor 1610 reads information in the memory 1620, to complete the steps of the method in combination with hardware of the processor 1610. To avoid repetition, details are not described herein again.

The terminal device 1500 shown in FIG. 36 or the terminal device 1600 shown in FIG. 37 can implement the processes corresponding to the foregoing method embodiment shown in FIG. 3. Specifically, for implementation of the terminal device 1500 or the terminal device 1600, refer to the descriptions in FIG. 3. To avoid repetition, details are not described herein again.

A person of ordinary skill in the art may be aware that, the units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division, and may be another division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to implement the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method carried out by a terminal device, the method comprising:
   receiving a Medium Access Control (MAC) protocol data unit (PDU) sent by an access network device,
   wherein the MAC PDU comprises at least two MAC subPDUs which comprise at least one first MAC subPDU, the at least one first MAC subPDU comprises a first MAC subheader and a random access response (RAR) corresponding to the first MAC subheader, and the first MAC subheader is located before and adjacent to the RAR;
   parsing an MAC subheader comprised in each MAC subPDU; and
   determining an MAC subPDU corresponding to the terminal device according to a result of parsing the MAC subheader,
   wherein the at least two MAC subPDUs further comprise a third MAC subPDU which comprises only a third MAC subheader, the third MAC subheader comprises backoff indicator (BI) information instructing the terminal device to determine a time interval to initiate a next random access request, based on no random access preamble identifier (RAPID) that is the same as a RAPID sent by the terminal device being present in a detected MAC PDU;
   wherein based on a RAPID having more than 6 bits, a plurality of RAPIDS in a group MAC subheader are concatenated to reduce bit overhead;
   wherein different backoff indicators (BIs) correspond to different random access priorities, and wherein a smaller BI associated with a shorter waiting time required for a re-initiating random access corresponds to a higher priority; and
   wherein a priority is determined based on quality of service (QoS) of a random access initiated by the terminal device, wherein a random access with higher QoS is associated with a higher priority.

2. The method according to claim 1, wherein the first MAC subheader comprises first indication information indicating a format type of the RAR which corresponds to a random access event.

3. The method according to claim 2, wherein one of the following situations (a) and (b) occurs:
   (a) the first indication information has a bit indicating the format type of the RAR explicitly; and
   (b) the first MAC subheader further comprises a first RAPID, and the first indication information implicitly indicates that there is a correspondence between the first RAPID and the format type of the RAR.

4. The method according to claim 1, wherein the at least two MAC subPDUs further comprise a second MAC subPDU which comprises only a second MAC subheader, the second MAC subheader comprises a second RAPID, and there is a correspondence between the second RAPID and each of one or more on-demand system information requests.

5. The method according to claim 1, wherein the third MAC subPDU is located before the first MAC subPDU and the second MAC subPDU, and the first MAC subPDU is located before the second MAC subPDU, or the first MAC subPDU is located after the second MAC subPDU.

6. The method according to claim 1, wherein the MAC PDU further comprises padding which is located at the end of the MAC PDU, and whether the MAC PDU comprises the padding and a length of the padding are determined based on a size of a transport block (TB), a number of all MAC subheaders and RARs.

7. A device comprising:
   a processor; and
   a non-transitory computer-readable storage medium storing a processor-executable program, which when executed, causes the processor to:
   determine a Medium Access Control (MAC) protocol data unit (PDU),
   wherein the MAC PDU comprises at least two MAC subPDUs which comprise at least one first MAC subPDU, the at least one first MAC subPDU comprises a first MAC subheader and a random access response (RAR) corresponding to the first MAC subheader, and the first MAC subheader is located before and adjacent to the RAR corresponding to the first MAC subheader; and
   send the MAC PDU,
   wherein the at least two MAC subPDUs further comprise a third MAC subPDU which comprises only a third MAC subheader, the third MAC subheader comprises backoff indicator information instructing a terminal device to determine a time interval to initiate a next random access request, based on no random access preamble identifier (RAPID) that is the same as a RAPID sent by the terminal device being present in a detected MAC PDU;
   wherein based on a RAPID having more than 6 bits, a plurality of RAPIDS in a group MAC subheader are concatenated to reduce bit overhead;
   wherein different backoff indicators (BIs) correspond to different random access priorities, and wherein a smaller BI associated with a shorter waiting time required for a re-initiating random access corresponds to a higher priority; and
   wherein a priority is determined based on quality of service (QoS) of a random access initiated by the terminal device, wherein a random access with higher QoS is associated with a higher priority.

8. The device according to claim 7, wherein the first MAC subheader comprises first indication information indicating a format type of the RAR corresponding to the first MAC subheader, and the format type of the RAR corresponds to a random access event.

9. The device according to claim 8, wherein one of the following situations (a) and (b) occurs:
   (a) the first indication information has a bit indicating the format type of the RAR explicitly; and
   (b) the first MAC subheader further comprises a first RAPID and the first indication information implicitly indicates that there is a correspondence between the first RAPID and the format type of the RAR.

10. The device according to claim 7, wherein the at least two MAC subPDUs further comprise a second MAC subPDU which comprises only a second MAC subheader, the second MAC subheader comprises a second RAPID, and there is a correspondence between the second RAPID and each of one or more on-demand system information requests.

11. The device according to claim 7, wherein the third MAC subPDU is located before the first MAC subPDU and the second MAC subPDU, and the first MAC subPDU is located before the second MAC subPDU, or the first MAC subPDU is located after the second MAC subPDU.

12. The device according to claim 7, wherein the MAC PDU further comprises padding which is located at the end of the MAC PDU, and whether the MAC PDU comprises the padding and a length of the padding are determined based on a size of a transport block (TB), a number of all MAC subheaders and RARs.

13. A terminal device comprising:
   a processor; and
   a non-transitory computer-readable storage medium storing a processor-executable program, which when executed, causes the processor to:
      receive a Medium Access Control (MAC) protocol data unit (PDU) sent by an access network device,
         wherein the MAC PDU comprises at least two MAC subPDUs which comprise at least one first MAC subPDU, the at least one first MAC subPDU comprises a first MAC subheader and a random access response (RAR) corresponding to the first MAC subheader, and the first MAC subheader is located before and adjacent to the RAR corresponding to the first MAC subheader;
      parse an MAC subheader comprised in each MAC subPDU; and
      determine an MAC subPDU corresponding to the terminal device according to a result of parsing the MAC subheader,
         wherein the at least two MAC subPDUs further comprise a third MAC subPDU which comprises only a third MAC subheader, the third MAC subheader comprises backoff indicator information instructing the terminal device to determine a time interval to initiate a next random access request, based on no random access preamble identifier (RAPID) that is the same as a RAPID sent by the terminal device being present in a detected MAC PDU;
      wherein based on a RAPID having more than 6 bits, a plurality of RAPIDS in a group MAC subheader are concatenated to reduce bit overhead;
      wherein different backoff indicators (BIs) correspond to different random access priorities, and wherein a smaller BI associated with a shorter waiting time required for a re-initiating random access corresponds to a higher priority; and
      wherein a priority is determined based on quality of service (QoS) of a random access initiated by the terminal device, wherein a random access with higher QoS is associated with a higher priority.

14. The terminal device according to claim 13, wherein one of the following situations (a) and (b) occurs:
   (a) a first indication information has a bit indicating the format type of the RAR explicitly; and
   (b) the first MAC subheader further comprises a first RAPID, and the first indication information implicitly indicates that there is a correspondence between the first RAPID and the format type of the RAR.

15. The terminal device according to claim 13, wherein the at least two MAC subPDUs further comprise a second MAC subPDU which comprises only a second MAC subheader, the second MAC subheader comprises a second RAPID, and there is a correspondence between the second RAPID and each of one or more on-demand system information requests.

16. The terminal device according to claim 13, wherein the third MAC subPDU is located before the first MAC subPDU and the second MAC subPDU, and the first MAC subPDU is located before the second MAC subPDU, or the first MAC subPDU is located after the second MAC subPDU.

17. The terminal device according to claim 13, wherein the MAC PDU further comprises padding which is located at the end of the MAC PDU, and whether the MAC PDU comprises the padding and a length of the padding are determined based on a size of a transport block (TB), a number of all MAC subheaders and RARs.

* * * * *